United States Patent [19]

Shimonaka et al.

[11] Patent Number: 5,548,434
[45] Date of Patent: Aug. 20, 1996

[54] SPATIAL LIGHT TRANSMISSION APPARATUS

[75] Inventors: Atsushi Shimonaka, Ikoma-gun; Mototaka Taneya; Hidenori Kawanishi, both of Nara; Tatsuya Morioka, Tenri, all of Japan

[73] Assignee: Sharp Kabushiki Kaisha, Osaka, Japan

[21] Appl. No.: 351,224

[22] Filed: Nov. 30, 1994

[30] Foreign Application Priority Data

Dec. 1, 1993 [JP] Japan .................... 5-301748
Mar. 11, 1994 [JP] Japan .................... 6-041508

[51] Int. Cl.$^6$ ........................... H04B 10/00
[52] U.S. Cl. ................. 359/161; 359/110; 359/152; 359/191
[58] Field of Search ............... 359/117, 118, 359/152, 159, 161, 172, 177, 190–191

[56] References Cited

U.S. PATENT DOCUMENTS 4,706,300  11/1987  Minemura et al. ............... 359/191

FOREIGN PATENT DOCUMENTS

0564075A1  2/1993  European Pat. Off. .
3-46839    2/1991  Japan .
5-160793   6/1993  Japan .

OTHER PUBLICATIONS

Patent Abstracts of Japan, vol. 11, No. 187 (E–1067) 1991 & JP–A–03 046 839 (NEC).
Nussmeier et al., "A 10.6–μm Terrestrial Communication Link", IEEE Journal of Quantum Electronics, vol. 10, No. 2, Feb. 1974, New York US, pp. 230–235.
Mercer, "Adaptive Coherent Optical Receiver Array", Electronics Letters, vol. 26, No. 18, 30 Aug. 1990, Stevenage GB.

Primary Examiner—Leo Boudreau
Assistant Examiner—Kinfe-Michael NeGash
Attorney, Agent, or Firm—Nixon & Vanderhye P.C.

[57] ABSTRACT

A spatial coherent light transmission apparatus according to the present invention, includes: a light transmitter for emitting a data signal as first coherent light; a light receiver for emitting second coherent light having a wavelength little different from that of The first coherent light, mixing and receiving the first and second coherent lights, and performing a coherent detection of the data signal. At least one of the light transmitter and the light receiver has a detection device for detecting at least one of a coherent light transmission state and a coherent light detection state. The apparatus further includes a control device for controlling at least one of the light transmitter and the light receiver based on information of the state detected by the detection device.

32 Claims, 24 Drawing Sheets

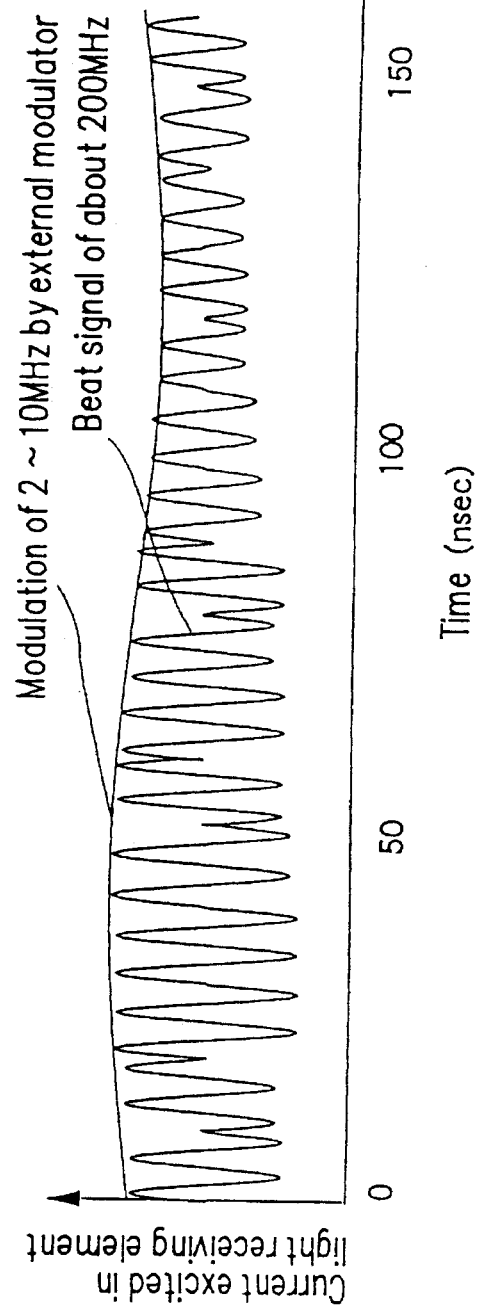
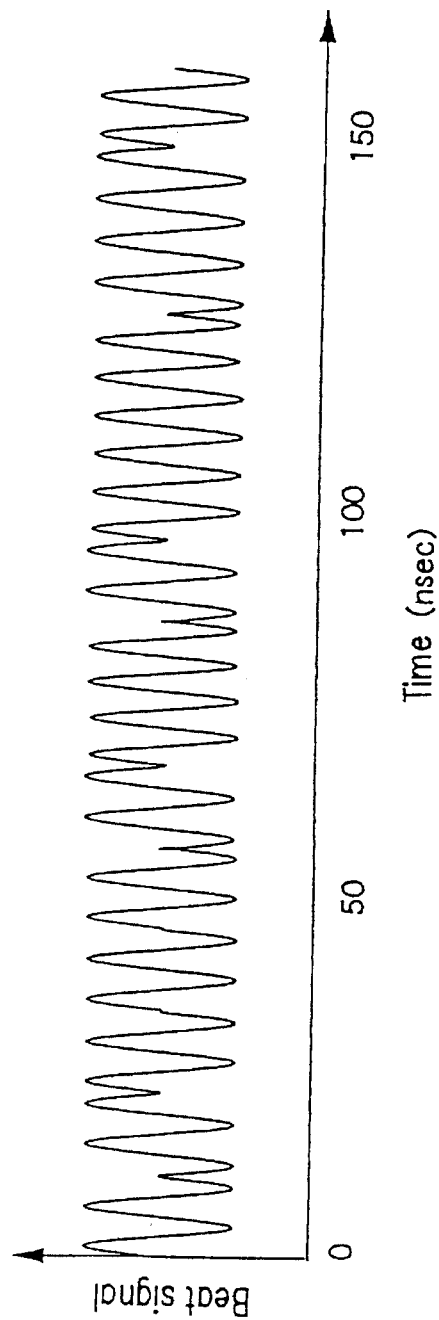

SPATIAL LIGHT TRANSMISSION APPARATUS

BACKGROUND OF THE INVENTION

1. Field of the Invention

The present invention relates to a spatial coherent light transmission apparatus for use in an optical communication system or the like.

2. Description of the Related Art

The spatial data transmission using light, which is free from indoor interference unlike a transmission using an electric wave as a medium, has been conventionally used for an information transmission for a short distance.

This transmission system has employed an intensity modified detection (IMDD) method in which a light emission diode (LED) is used as a transmission light source and the modulation of the light intensity thereof allows data to be decoded. On the other hand, a spatial light transmission apparatus using a coherent detection technique has been put into practical use.

In these days, data transmission such as digital moving image transmission is required to perform the transmission with a higher speed. However, data transmission for a long distance has been impossible because the optical current power decreases in proportion to the communication distance to the fourth power.

For example, the transmission side uses an LED having an emission power of 100 mW diffusing light over ±60 degrees for a spatial transmission while the receiving side has a light receiving portion in the shape of a circle with a diameter of 1 cm. In this case, the communication distance, which allows the transmission speed to be 100 Mbit/s and the transmission bit error rate (BER) to be $10^{-9}$, with the use of a baseband modulation, is 1 m or less. Hereinafter, it is assumed that the BER is less than $10^{-9}$ where a signal to noise ratio (SNR) is 20 dB.

The conventional spatial transmission apparatus using a coherent light detection will be described.

FIG. 1 is a diagram showing the configuration of a beat signal detection device for use in a conventional wireless optical communication system. As shown in FIG. 1, a signal beam 1 is incident through an incidence window portion 2 having a collecting lens. Then, the signal beam 1 passes through an optical multiplexer/demultiplexer 3 and is incident onto one of light receiving elements 4a of a light receiving element array 4. On the other hand, a locally oscillated beam is generated from a semiconductor laser 5 and is collimated by a collimator lens 6. Thereafter, the locally oscillated beam is diffused by a diffusion optical element 7 and becomes a diffused locally oscillated beam 8, which is diffusion plane waves. The travelling direction of the locally oscillated diffused beam 8 is changed by an optical multiplexer/demultiplexer 3. Thereafter, the diffused beam 8 is mixed with the signal beam 1 and is incident onto the light receiving element array 4. Herein, a selfog lens array (intervals between lenses: 1 mm, and numerical aperture: 0.2) is used as the diffusion optical element 7. By means of this diffusion optical element 7, the plane wave components of a diffused locally oscillated beam 8a at intervals of 0.05 degree exist over the light receiving array 4. The angular range where the components exist is determined by the numerical aperture of the diffusion optical element 7, which is a selfog lens array, and is ±11.5 degrees.

An angular range larger than ±11.5 degrees weakens each of the plane wave components to a degree such that it makes actual communication impossible. Herein, if the deviation of the incident direction of the signal beam 1 is within ±11.5 degrees, a beat signal can be detected by the diffused locally oscillated beam 8a. However, in the case where the incident direction deviates out of this range, the optical multiplexer/demultiplexer 3 is rotated by an actuator so that the beat signal can be detected.

This actuator will be described hereinafter. The optical multiplexer/demultiplexer 3 is disposed on a rotation stage 10 to which a magnet 9 is attached. The central portion of the rotation stage 10 is adhered to a rod with a soft resin adhesive (not shown). Furthermore, coils 11 and 12 generating magnetic fields in vertical and horizontal directions with respect to the paper surface of FIG. 1 are respectively provided so that the rotation stage 10 and the optical multiplexer/demultiplexer 3 can be rotated by means of the interaction between the magnetic fields and the magnet 9.

The signal detected by the light receiving element array 4 is processed by a control circuit 13 so as to optimize currents to flow into current sources 14 and 15. Thus, coherent detection can be performed by making the wavefront of the signal beam 1 and that of the diffused locally oscillated beam 8a coincide with each other (wavefront alignment). Also, the detected beat signal is processed by a beat signal frequency control circuit 16 so that the wavelengths of the signal been 1 and the locally oscillated been 8a are controlled with a predetermined relationship therebetween. For this purpose, the temperature of the semiconductor laser 5 serving as an LD generating the locally oscillated beam is controlled by a temperature controller 17 (wavelength tuning).

Such a conventional configuration has an advantage that a data transmission at a high speed is normally assured, but has problems as follows:

1. Under the condition where the beat signal is not detected e.g., at the time of starting the communication, a long time has to be taken for scanning the temperature or the like to realize wavelength tuning, which hinders the communication being performed at a high speed;

2. If the beat signal cannot be detected because a deviation arises either in the wavefront alignment and wavelength tuning at the time of starting the communication or during data transmission, it is impossible to judge whether the wavefront or wavelength deviates. As a result, a long time is taken before cancelling the deviation. This is a great problem, especially in the case where the apparatus is mounted on a moving object, because wavefront deviation is always likely to occur.

3. If any problem occurs during data transmission, such as deviation of wavefront or wavelength, an obstacle existing on the optical path, etc., data is lost over the corresponding term. Moreover, the transmission side cannot detect the condition of the receiving side, so that the timing of transmitting data, the confirmation whether or not the data is received, the certification of the transmitted data and the like have been impossible.

4. In a short distance communication, the data cannot be stably received, since coherent detection between a spherical wave (signal beam) and a plane wave (locally oscillated beam) is employed. This problem will be described in more detail hereinafter.

Now, it is assumed that a light receiving element with a circular light receiving portion occupies a circular shape on the x-y plane, where the center of the circle is it the origin and the radius thereof is R. When the transmission light source is disposed at the point (0, 0, z) on the z axis, a photocurrent I (z, r), excited at the point apart from the origin by a distance of r, is expressed by the following Equation (1):

$$I(z,r) = \frac{e\eta}{\hbar\omega} \left[ \epsilon \frac{P_1}{z^2} + (1-\epsilon)P_2 + \frac{2\sqrt{(1-\epsilon)P_1 P_2}}{z} \cos\left(\Delta\omega t + \Delta\phi + \frac{2\pi\sqrt{r^2+z^2}-z}{\lambda}\right) \right] \quad (1)$$

where $P_1$ and $P_2$ are power densities of the transmission light source and the local oscillation light source, $\hbar\omega$ is an energy of light, e is an elementary electric charge, $\epsilon$ is a power transmittance of the signal beam, $\eta$ is a photon-electron conversion efficiency, and $\lambda$ is a central wavelength of the light. Besides, $\Delta\omega$ and $\Delta\phi$ are differences in angular frequency end light phase between the transmission beam and the locally oscillated beam, and the third term of this equation stands for a beat signal.

Herein, a current flowing through the entire light receiving element, $I_{Total}(z)$, is obtained by integrating this photocurrent I (z, r) over a light receiving face as expressed by the following Equation (2):

$$I_{(Total)}(z) = \pi \frac{e\eta}{\hbar\omega} \left[ \epsilon \frac{P_1}{z^1} + (1-\epsilon)P_2 \right] R^2 + 4 \frac{e\eta}{\hbar\omega} \sqrt{\epsilon(1-\epsilon)P_1 P_2} \; \lambda \sin\left(\frac{\pi R^2}{2z\lambda}\right) \cos\left(\Delta\omega t + \Delta\phi + \frac{\pi R^2}{2z\lambda}\right) \quad (2)$$

where an approximate value expressed by the following Expression (3) is used:

$$\Delta\omega t + \Delta\phi + \frac{2\pi\sqrt{r^2+z^2}-z}{\lambda} \approx \Delta\omega t + \Delta\phi + \frac{\pi r^2}{z\lambda}, \quad (3)$$

$$\text{where } \frac{r}{z} \ll 1$$

As is apparent from the above equations, the value of the amplitude of a beam signal current monitored over the entire light receiving element oscillates depending on the distance z. Accordingly, when the distance z is large, the light receiving portion has to become large in size in order to receive and demodulate a weak signal beam. On the other hand, when the distance z is small, reliable receiving operation is impossible, because the amplitude of the beat signal is unstable.

FIG. 2 shows characteristics of the receiving power and the noise power in the IMDD method of 100 MHz. Herein, the power of the signal beam light source is 100 mW, a light emission angle is ±60 degrees, the radius of the light receiving element is 5 mm and the receiving frequency hand width is 100 MHz. FIG. 3 shows the characteristics of the signal power and the noise power in the coherent detection of 100 Mbit/s. Herein, the transmission light source is a semiconductor laser diode (LD) adjusted so as to have a power of 100 mW, an amplitude of 10 MHz, and a light emission angle of ±60 degrees. The light receiving element has a radius of 2 mm, and the receiving frequency band width is 100 MHz. In each of the figures, 0 denotes the demodulated signal power and ● denotes the noise power.

As is apparent from these figures, in the case of IMDD, although a transmission with a high SRN is assured in a short distance communication, the SRN sharply deteriorates in a long distance communication. In the case of coherent detection, though an SNR higher than that of the IMDD method can be obtained in a long distance communication, a stable receiving operation is not assured in a short distance communication.

Furthermore, Japanese Laid-Open Patent Publication No. 3-46839 proposes a coherent light transmission between satellites. According to this proposal, a light receiver detects the fluctuation in the beat signal frequency corresponding to the amount of change in the wavelength caused by a Doppler shift. The information on the fluctuation is sent to a transmitter as an electric wave or a light signal. On the transmission side, the fluctuation amount is absorbed, whereby the transmission wavelength is roughly adjusted.

This proposed configuration allows a stable wavelength tuning in the case where no deviation arises in the wavelength for communication between facing stations. However, in spatial coherent transmission with the use of a household mobile communication apparatus or the like, the interruption of communication due to wavefront deviation or an obstacle existing in the course of transmission is problematic. The loss of data cannot be prevented in the configuration. Also, in this configuration, the transmission wavelength on the transmission side fluctuates. As a result, it is impossible to provide two or more receiving side devices with respect to one transmission side.

SUMMARY OF THE INVENTION

A spatial coherent light transmission apparatus according to the present invention includes: a light transmitter means for emitting a data signal as first coherent light; a light receiver means for producing second coherent light having a wavelength little different from that of the first coherent light, mixing the first and second coherent lights, and performing a coherent detection of the data signal, each of the light transmitter means end the light receiver means having a detection means for detecting at least one of a coherent light transmission state and a coherent light detection state; and a control means for controlling at least one of the light transmitter means and the light receiver means based on information of the state detected by the detection means.

In one embodiment of the invention, the control means includes: a control signal transmission section for transmitting a control signal intensity-modulated in accordance with the information of the state detected by the detection means; a control signal light receiving section for receiving the control signal; and a control section for controlling transmission of the data signal by performing a direct detection of a photocurrent received by the control signal light receiving section.

In another embodiment of the invention, at least one of a beat signal intensity, a beat signal frequency and a noise current intensity is detected by the detection means as the coherent light detection state.

In another embodiment of the invention, a temperature and an oscillation frequency is detected by the detection means as the coherent light transmission state.

In another embodiment of the invention, the spatial coherent light transmission apparatus includes: a receiving section providing a means for receiving the first and second coherent lights, the means serving also as a control signal light receiving section for receiving the control signal; a filter section for separating a signal received by the receiving section into the control signal and a beat signal; a control signal detection section for performing a direct detection of the control signal separated by the filter section; and a beat signal detection section for performing the coherent detection of the beat signal separated by the filter section.

In another embodiment of the invention, the spatial coherent light transmission apparatus includes: a first light receiving means for receiving and converting the mixed first and second coherent lights into an electric signal; a control signal outputting means for outputting a control signal in accordance with a value of he electric signal converted by the first light receiving means; a direct detection means for performing a direct detection by using the electric signal; and a switching means for switching the direct detection performed by the direct detection means and the coherent detection, in response to the control signal.

In another embodiment of the invention, the light receiver means includes: a locally oscillated beam generating means for generating a locally oscillated beam for the coherent detection; and an oscillation frequency switching means for switching an oscillation frequency of the locally oscillated beam generating means in response to the control signal.

In another embodiment of the invention, the light receiver means includes a transmitting means for transmitting a control data signal to the light transmitter means in response to the control signal: and the light transmitter means includes a receiving means for receiving the control data signal transmitted from the transmitting means and a modifying means for modifying a modulation method in response to the control data signal received by the receiving means.

In another embodiment of the invention, the light receiver means includes: a light amount adjustment means for adjusting a light amount input to the first light receiving means; a maximum value detection means for detecting a maximum value of the beat signal supplied from the first light receiving means; and a light amount control means for controlling the light amount adjustment means in response to an output signal from the maximum value detection means.

In another embodiment of the invention, the light receiver means includes: a second light receiving means disposed adjacent to the first light receiving means; a phase difference detection means for detecting a phase difference between a signal from the first light receiving means and a signal from the second light receiving means; a phase inversion means, connected to one of the first light receiving means and the second light receiving means, for inverting a phase of the signal from the connected light receiver means in response to an output signal of the phase difference detection means; and an addition means for adding the signal of which phase is inverted by the phase inversion means and the signal of the other of the first light receiving means and second light receiving means.

In another embodiment of the invention, the spatial coherent light transmission apparatus further includes a collective means for collecting incident light, disposed on a front face of the light receiver means.

In another embodiment of the invention, the spatial coherent light transmission apparatus further includes an aperture means for limiting incident light, disposed on the front face of the light receiver means.

In another aspect of the present invention, a spatial coherent light transmission apparatus includes: a light transmitter means for emitting a data signal as first coherent light; and a light receiver means for generating second coherent light having a wavelength little different from that of the first coherent light, mixing the first and second coherent light, and performing a coherent detection of the data signal, the light receiver means including a detection means for detecting a coherent light detection state; and a control means for controlling at least one of the light transmitter means and the light receiver means based on information of the state detected by the detection means.

In one embodiment of the invention, the control means includes: a control signal transmission section, disposed in the light receiver means, for transmitting a control signal intensity-modulated in accordance with the information of the state detected by the detection means; a control signal light receiving section, disposed in the light transmitter means, for receiving the control signal; and a control section, disposed in the light transmitter means, for controlling transmission of the data signal by performing a direct detection of a photocurrent received by the control signal light receiving section.

In another embodiment of the invention, the control means further includes a wavelength tuning section, disposed in the light receiver means, for controlling a wavelength of the second coherent light so as to attain a wavelength tuning based on information of the state detected by the detection means.

In another embodiment of the invention, at least one of a beat signal intensity, a beat signal frequency and a noise current intensity is detected by the detection means as the coherent light detection state.

In another embodiment of the invention, one unit serves as the light transmitter means for emitting a light signal as the first coherent light, as a means for generating the second coherent light, and as the control signal transmission section for transmitting the control signal, and another unit serves as a means for receiving the first and second coherent lights and as a control signal light receiving section for receiving the control signal, whereby the light transmitter means serves also as the light receiver means.

In another embodiment of the invention, the spatial coherent light transmission apparatus includes: a receiver section serving both as a means for receiving the first and second coherent lights and as a control signal light receiving section for receiving the control signal; a filter section for separating a signal received by the receiver section into the control signal and a beat signal; a control signal detection section for performing a direct detection of the control signal separated by the filter section; and a beat signal detection section for performing the coherent detection of the beat signal separated by the filter section.

In another embodiment of the invention, the light receiver means includes: a first light receiving means for receiving and converting the mixed first and second coherent lights into an electric signal; a control signal outputting means for outputting a control signal in accordance with a value of the electric signal converted by the first light receiving means; a direct detection means for performing a direct detection by using the electric signal; and a switching means for switching the direct detection performed by the direct detection means and the coherent detection, in response to the control signal.

In another embodiment of the invention, the light receiver means includes: a locally oscillated beam generating means for generating a locally oscillated beam for the coherent detection; and an oscillation frequency switching means for switching an oscillation frequency of the locally oscillated beam generating means in response to the control signal.

In another embodiment of the invention, the light receiver means includes a transmitting means for transmitting a control data signal to the light transmitter means in response to the control signal, and the light transmitter means includes a receiving means for receiving the control data signal transmitted from the transmitting means and a modifying means for modifying a modulation method in response to the control data signal received by the receiving means.

In another embodiment of the invention, the light receiver means includes: a light amount adjustment means for adjusting a light amount input to the first light receiving means; a maximum value detection means for control means for controlling the light amount adjustment detecting a maximum value of the beat signal supplied from the first light receiving means; and a light amount means in response to an output signal from the maximum value detection means.

In another embodiment of the invention, the light receiver means includes: a second light receiving means disposed adjacent to the first light receiving means; a phase difference detection means for detecting a phase difference between a signal from the first light receiving means and a signal from the second light receiving means; a phase inversion means, connected to one of the first light receiving means and the second light receiving means, for inverting a phase of the signal from the connected light receiving means in response to an output signal of the phase difference detection means; and an addition means for adding the signal of which phase is inverted by the phase inversion means and the signal of the other of the first light receiving means and second light receiving means.

In another embodiment of the invention, the spatial coherent light transmission apparatus further includes a collective means for collecting incident light, disposed on a front face of the light receiver means.

In another embodiment of the invention, the spatial coherent light transmission apparatus further includes an aperture means for limiting incident light, disposed on the front face of the light receiver means.

In another aspect of the invention, a spatial coherent light transmission apparatus includes: a light transmitter means for emitting a data signal as first coherent light, the light transmitter means including a detection means for detecting a coherent light transmission state; a light receiver means for emitting second coherent light having a wavelength little different from that of the first coherent light, mixing and receiving the first and second coherent light, and performing a coherent detection of the data signal; and a control means for controlling at least one of the light transmitter means and the light receiver means based on information of the state detected by the detection means.

In one embodiment of the invention, the light transmitter means includes a first detection section for detecting a coherent light transmission state, and a signal transmission section for transmitting a control signal of information of the state detected by the first detection section as a light signal obtained by intensity-modulating the data signal; the light receiver means includes a signal receiving section for receiving the light signal, a second detection section for detecting a coherent light transmission state and a coherent light detection state from the control signal and the data signal of the light signal received by the signal receiving section, and a wavelength tuning section for controlling a wavelength of the second coherent light based on information of the state detected by the second detection section so as to attain a wavelength tuning; the detection means includes the first and second detection sections; and the control means includes the signal transmission section and the wavelength tuning section.

In another embodiment of the invention, at least one of a beat signal intensity, a beat signal frequency and a noise current intensity is detected by the detection means as the coherent light detection state.

In another embodiment of the invention, a temperature and an oscillation frequency is detected by the detection means as the coherent light transmission state.

In another embodiment of the invention, one unit serves as the light transmitter means for emitting a light signal as the first coherent light, as a means for generating the second coherent light, and as the control signal transmission section for transmitting the control signal, and another unit serves as a means for receiving the first and second coherent lights and as a control signal light receiving section for receiving the control signal, whereby the light transmitter means serves also as the light receiver means.

In another embodiment of the invention, the spatial coherent light transmission apparatus includes: a receiving section including a means for receiving the first and second coherent lights, the means serving also as a control signal light receiving section for receiving the control signal; a filter section for separating the signal received by the receiving section into the control signal and a beat signal; a control signal detection section for performing a direct detection of the control signal separated by the filter section; and a beat signal detection section for performing the coherent detection of the beat signal separated by the filter section.

In another embodiment of the invention, the light receiver means further includes a control signal transmission section for transmitting a second control signal intensity-modulated in accordance with information of the state detected by the detection means: end the light transmitter means includes a control signal light receiving section for receiving the second control signal, and a control section for controlling transmission of the data signal by performing a direct detection of a photocurrent received by the control signal light receiving section.

According to the above-mentioned configuration, data transmission is performed while the coherent detection state is confirmed by the light receiving means, e.g., at the time of starting communication. So, for example, in the case where the heat signal is not detected by the detection means, the information of non-detection is transmitted from the control signal transmission section to the control signal receiving section, so that the transmission of the data light signal is controlled by the control section. Accordingly, even if the beat signal is not detected, the loss of data at the time of beat signal non-detection can be prevented by resending the same data signal. Also, at this time, the wavelength tuning section controls the wavelength of the second coherent light so as to obtain the wavelength tuning on the basis of the detection state information detected by the detection section. Accordingly, even if wavelength deviation arises, wavelength tuning is easily attained and the data transmission at a high speed is assured.

In addition, in some cases, depending on the using conditions on the receiving side, the beat signal cannot be detected only by changing the wavelength on the receiving side. Even in such a case, the receiving side detects the beat signal detection state and informs the transmission side of the information on such a state, thereby controlling the wavelength on the transmission side. Hence, each of the transmission side and the receiving side uses, for example, a semiconductor laser, whereby the beat signal can be detected within the range of temperatures at which the semiconductor laser is operable.

The receiving section detects the beat signal detection state and controls the oscillation wavelength of the receiving side itself. Thus, the beat signal can be detected without changing the wavelength on the transmission side. Hence, a plurality of receiving sides can be provided with respect to one transmission side, and applications such as a local area network become possible.

If the receiving section attempts to perform wavelength tuning by paying attention only to the beat signal, and if the receiving and transmission sides are respectively provided with lasers, only the beat signal frequency, i.e. the difference in wavelength between the two lasers can be detected. In the case where a wavelength deviation arises in such a situation, there is no clue for knowing whether to increase or reduce the wavelength of the locally oscillated beam. However, the wavelength tuning on the receiving side can be performed more simply by causing the transmission side to transmit the data on the wavelength of the transmission side itself.

The transmission and receiving sides mutually monitor each other's state. Thus, information such as the necessity of resending data, a laser failure, etc. are obtained, and both sides can be most appropriately controlled by using such information. Especially, mutual monitoring has been realized for the first time by using the light intensity modulation and the direct detection technique in combination, which has been impossible even in a bi-directional coherent light transmission apparatus if neither wavefront alignment nor wavelength tuning is attained.

By knowing the noise current intensity or the like, it becomes possible to inform the user of whether the communication is available or not. Moreover, the user can correctly grasp the cause making the communication impossible.

The receiving side can detect the temperature and oscillation frequency of the oscillation side with a high accuracy. So, in the case where the beat signal cannot be detected, the user can find that a wavefront deviation has occurred. This is useful as a clue for determining the process of wavelength tuning and wavefront alignment.

The same element may be used as the control signal transmission section and also as the coherent light signal transmission section. For example, a semiconductor laser may be used as the control signal transmission section and the coherent light signal transmission section, whereby the number of times of using the semiconductor laser can be reduced, and the apparatus can be fabricated at a lower cost.

The same element may be used as the control signal transmission section and as the coherent light signal transmission section. This makes the circuit configuration simpler, end the apparatus can be fabricated to be smaller and more lightweight.

On the light receiving section, the locally oscillated beam generating means generates the locally oscillated beam for performing the coherent detection. The signal beam transmitted from the light transmission section end the locally oscillated beam supplied from the locally oscillated beam generating means are mixed so as to be supplied to the light receiving means. The light receiving means receives the mixed signal beam and converts it into an electric signal. The electric power value of the converted electric signal obtained by the light receiving means is compared with a predetermined value by the control signal outputting means, and a control signal in accordance with the result of the comparison is output. The signal subjected to the direct detection by the direct detection means and the signal subjected to the coherent detection by the coherent detection means are input to the switching means, and one of the signals is output in response to the control signal output from the control signal outputting means. Also, the oscillation frequency of the locally oscillated beam generating means is switched by the oscillation frequency switching means in response to the control signal output from the control signal outputting means.

Herein, the light receiving section may further include the transmission means, and the light transmission means may further include the receiving means and the modifying means. In such a case, the transmission means transmits data to the transmission section in accordance with the control signal from the control signal outputting means so as to be sent to the receiving means provided in the light transmission section. The modifying means modifies the modulation method in accordance with the data received by the receiving means.

Also, in the case where the light transmission section includes light amount control means, maximum value detection means and control means, the maximum value detection means detects the maximum value of the beat signal supplied from the light receiving means. On the basis of the detected beat signal, the control means controls the light amount control means so as to control the light mount of the light to be input to the light receiving means.

On the other hand, in the case where the light transmission section further includes second light receiving means, phase difference detection means, phase inversion means and addition means, the phase difference between the signal outputs from the first and second light receiving means is detected by the phase difference detection means and sent to the phase inversion means. The phase inversion means is connected to either one of the first and second light receiving means. This phase inversion means inverts the phase in response to the output from the phase difference detection means. The signal passed through the phase inversion means and the signal not passed through the phase inversion means are added to each other by the addition means.

In the case where the light receiving means further includes the light collecting means, the wavefront of the incident light is converted so as to be aligned with the wavefront of the locally oscillated beam. Thus, coherent detection with high efficiency is realized.

In addition, in the case where the light receiving means further includes aperture means, the incident light is controlled by the aperture means, which allows the detection of the maximum value of the beat signal.

Thus, the present invention described herein makes possible the advantages of (1) providing a spatial coherent light transmission apparatus capable of performing a high speed communication and preventing the loss of data, even in the case where the beat signal is not detected or in the case where the beat signal cannot be detected; and (2) providing a spatial coherent light transmission apparatus capable of a stable receiving operation regardless of whether the communication distance is long or short.

These and other advantages of the present invention will become apparent to those skilled in the art upon reading and understanding the following detailed description with reference to the accompanying figures.

BRIEF DESCRIPTION OF THE DRAWINGS

FIG. 8A is a waveform chart showing a current excited in the light receiving element 35, in the main portions of the apparatus as shown in FIG. 7.

FIG. 8B is a waveform chart showing a beat signal immediately after an AGC circuit 62a, in the main portions of the apparatus as shown in FIG. 7.

DESCRIPTION OF THE PREFERRED EMBODIMENTS

The examples of the present invention will be described hereinafter, with reference to accompanying drawings.

EXAMPLE 1

Figure 1:
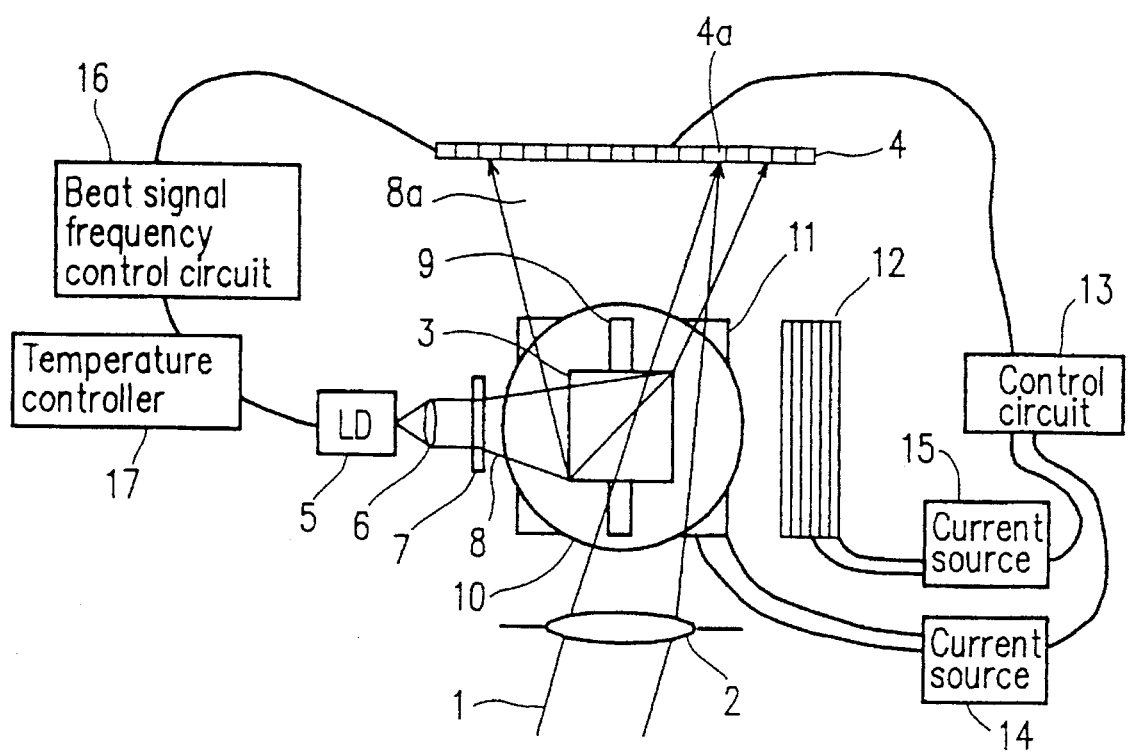
FIG. 1 is a diagram showing the configuration of a beat signal detection device for use in a conventional optical communication system.
Figure 2:
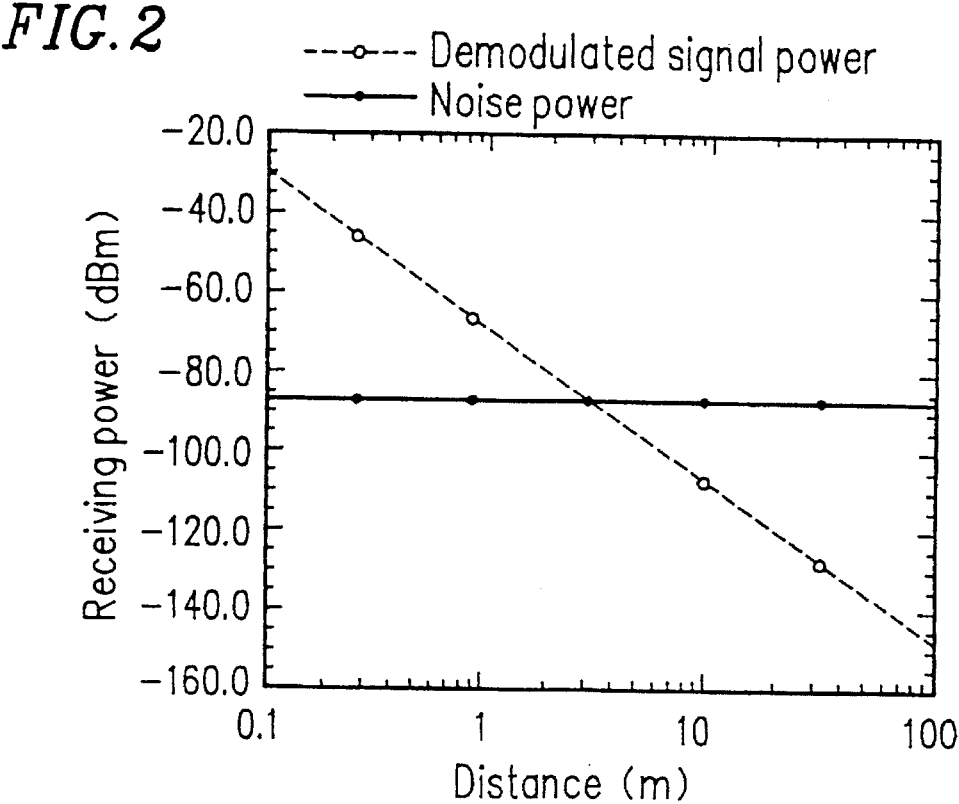
FIG. 2 is a graph showing the characteristics of the receiving power and the noise power in the IMDD method.
Figure 3:
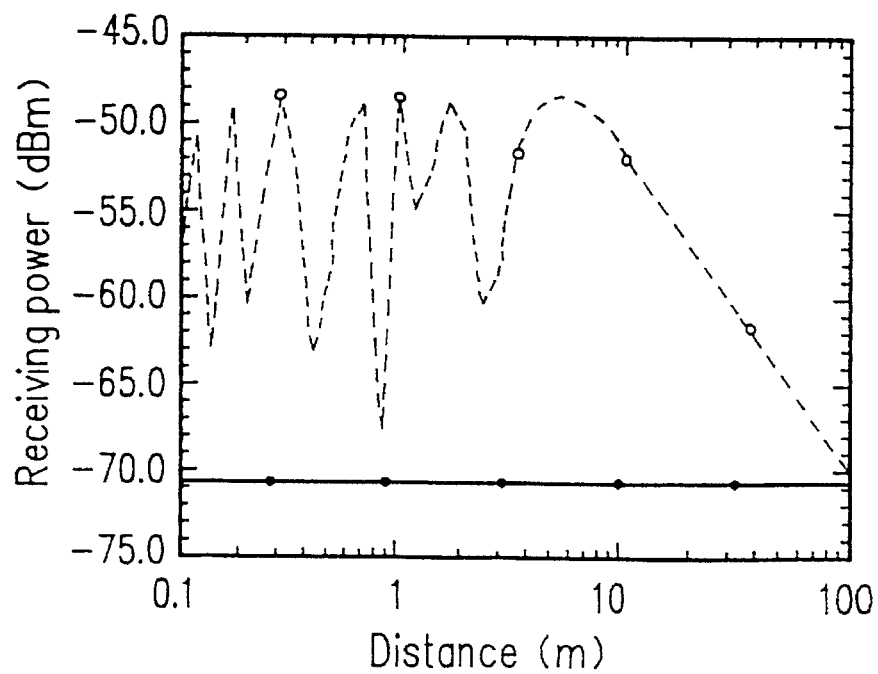
FIG. 3 is a graph showing the characteristics of the signal power and the noise power in coherent detection.
Figure 4:
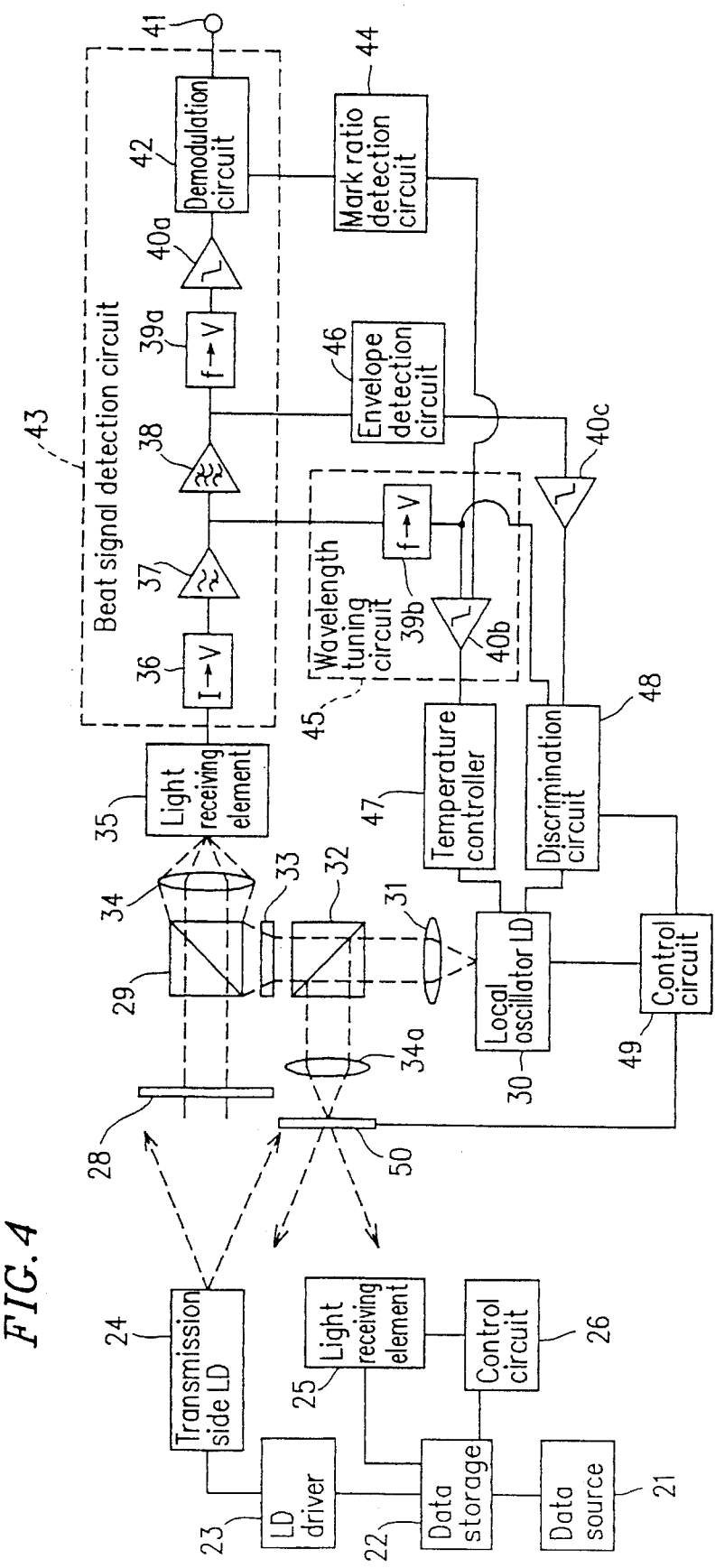
FIG. 4 is a block diagram showing the spatial light transmission apparatus of Example 1 of the present invention.

With reference to FIG. 4, a spatial coherent light transmission apparatus of Example 1 of the present invention will be described. FIG. 4 is a block diagram showing the configuration of the spatial coherent light transmission apparatus of Example 1.

First, the configuration of a transmission section will be described. As shown in FIG. 4, a data source 21, which generates data to be transmitted, is connected to a data storage 22 so that the data from the data source 21 can be temporally stored in the data storage 22. This data storage 22 is connected to an LD driver 23, which is connected to a transmission side LD 24. This transmission side LD 24 is controlled so as to generate a light signal in accordance with the data from the data storage 22 by the LD driver 23. A light receiving element 25, which is directly connected to the data storage 22, is connected to the data storage 22 also via a control circuit 26 so as to receive a control light signal generated from the receiving side, demodulate and output it to the data storage 22.

On the other hand, a receiver section is basically configured in the following manner. That is, a light filter 28 and an optical multiplexer/demultiplexer 29, which is a beam splitter, are disposed so as to be apart from each other by a predetermined interval. The light signal from the transmission side LD 24 is input to the optical multiplexer/demultiplexer 29 via a light filter 28. In connection with the optical multiplexer/demultiplexer 29, a local oscillator LD 30 for generating a locally oscillated beam, a collimator lens 31, an optical multiplexer/demultiplexer 32, which is a beam splitter, and a diffusion micro lens array 33 which is a light diffusion element are provided. The locally oscillated beam from the local oscillator LD 30 passes through the collimator lens 31 and the optical multiplexer/demultiplexer 32 and is diffused by the diffusion micro lens array 33, whereby diffusion plane waves are generated thereby and input to the optical multiplexer/demultiplexer 29. A light receiving element 35 is provided so as to face the optical multiplexer/demultiplexer 29 via a collective lens 34. The signal beam and the diffused plane waves are mixed by the optical multiplexer/demultiplexer 29 so as to be input to the light receiving element 35 via the collective lens 34.

A current-voltage conversion circuit (hereinafter, referred to as "I-V circuit") 36, to which the light receiving element 35 is connected, is connected to a high-pass filter 37 which is a high frequency pass filter. The high-pass filter 37 is connected to a band pass filter 38 which As an intermediate frequency pass filter. The band pass filter 38 is connected to a beat signal demodulation circuit 42, via a frequency-voltage conversion circuit (hereinafter, referred to as "f-V circuit") 39a and a comparator 40a. To this beat signal demodulation circuit 42, an output terminal 41 is connected. The I-V circuit 36, high-pass filter 37, band pass filter 38, f-V circuit 39a, comparator 40a and beat signal demodulation circuit 42 constitute a beat signal detection circuit 43 for detecting a beat signal.

A mark ratio detection circuit 44, to which the beat signal demodulation circuit 42 is connected, detects a mark ratio of the detected beat signal. The mark ratio indicates the ratio of the number of bits of 0 or bits of 1 with respect to the total number of bits. An f-V circuit 39b, to which the output terminal of the high-pass filter 37 is connected, is connected to one of the input terminals of a comparator 40b. To the other input terminal, the output terminal of the mark ratio detection circuit 44 is connected. The f-V circuit 39b and the comparator 40b constitute a wavelength tuning circuit 45 for performing the wavelength tuning on the basis of the beat signal.

Furthermore, an envelope detection circuit 46, to which the output terminal of the band-pass filter 38 is connected, is connected to a comparator 40c. The output terminal of the comparator 40c and the f-V circuit 39b are connected to a discrimination circuit 48 so as to discriminate among the emission intensity of the local oscillator LD 30, the beat signal intensity and the beat signal frequency. The output terminal of a temperature controller 47, to which the output terminal of the comparator 40b is connected, and that of the discrimination circuit 48 are connected to the local oscillator LD 30. Also, the discrimination circuit 48 is connected to a light shutter 50 using a liquid crystal plate via a control circuit 49. By the output from the discrimination circuit 48, a control signal is generated from the control circuit 49 so that the light shutter 50 is controlled to be turned ON or OFF.

An actual data transmission operation performed with the above configuration will be described hereinafter.

Figure 5A:
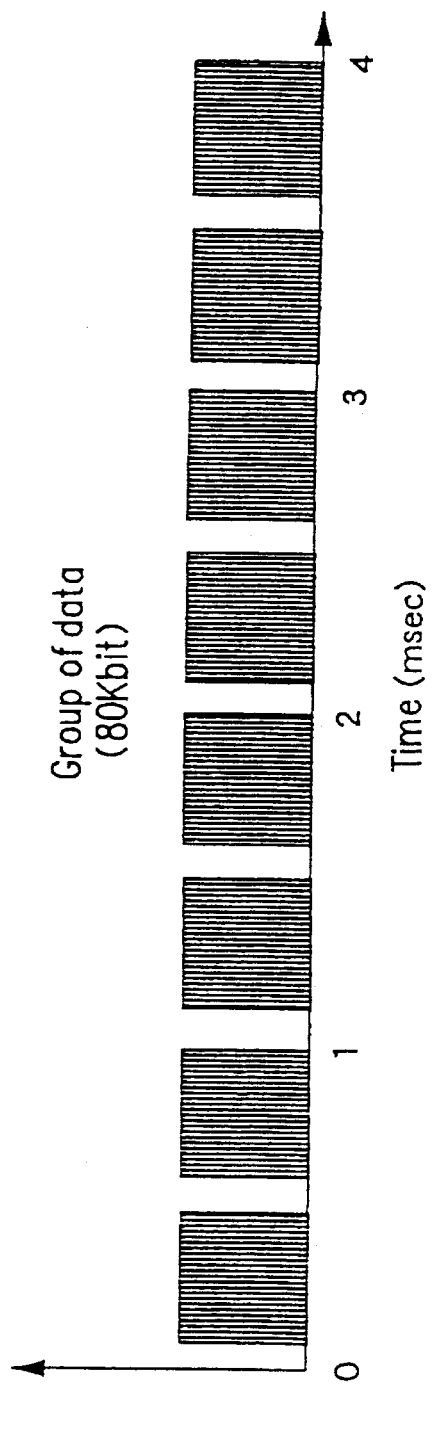
FIG. 5A is a waveform chart showing a data pulse in the main portions of the apparatus as shown in FIG. 4.
Figure 5B:
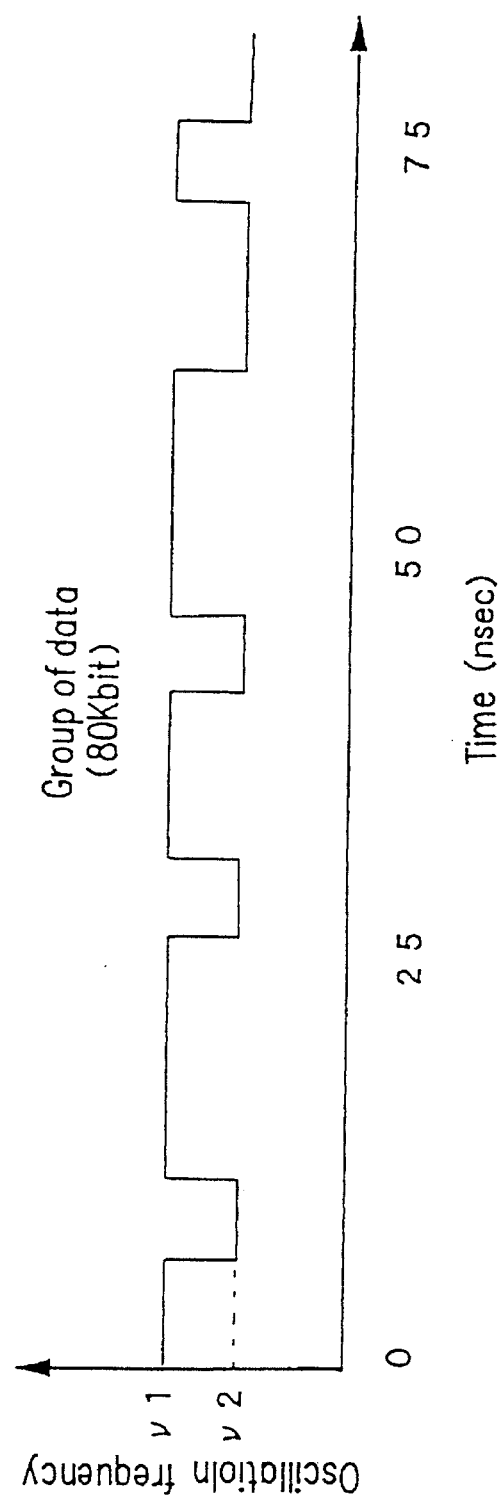
FIG. 5B is a waveform chart showing a signal beam oscillation frequency in accordance with 1 or 0 of the data in the main portions of the apparatus as shown in FIG. 4.

First, on the transmission side, the data source 21 generates a group of pulses (equivalent to 80 Kbits) each having a time length of 0.4 msec every 0.5 msec as shown in FIG. 5A. The data of the group of pulses is stored in the data storage 22. At the same time, the data drives the transmission side LD 24, which is a semiconductor laser, through the LD driver 23. At this time, the drive current of the transmission side LD 24 is changed in accordance with the value of the data, i.e. 1 or 0. Thus, as shown An FIG. 5B, the light is oscillated at an oscillation frequency of v1 or v2 in accordance with the data.

Figure 6A:
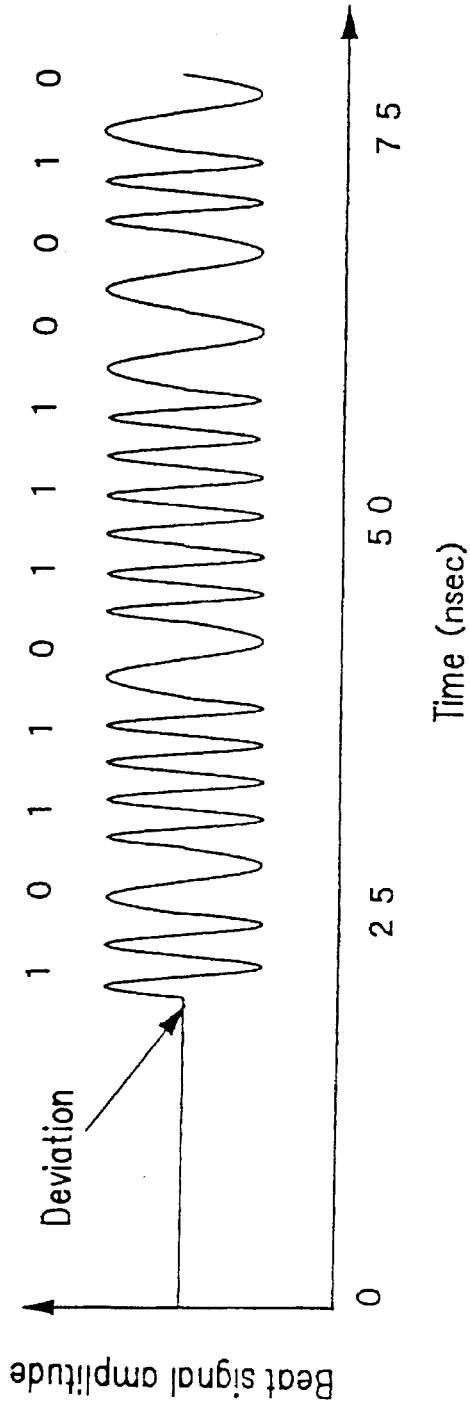
FIG. 6A is a waveform chart showing a beat signal obtained when wavefront alignment or wavelength tuning is attained, and when a wavefront deviation or wavelength deviation arises, in the main portions of the apparatus as shown in FIG. 4.
Figure 6B:
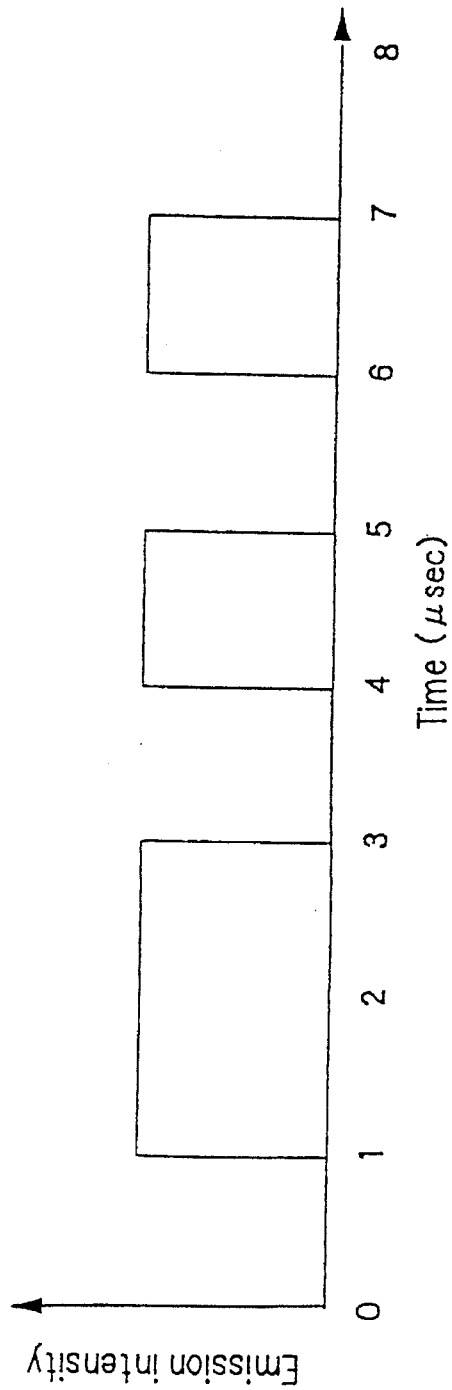
FIG. 6B is a waveform chart showing the light intensity of the control signals in the main portions of the apparatus as shown in FIG. 4.

Next, on the receiving side, a beat signal is excited in the light receiving element 35 by overlapping the received signal beam with the diffusion plane waves of a wavelength of λ3, emitted by the local oscillator LD 30 or the like, (where λ3 denotes the wavelength of the beam having a frequency of v3, and the same relationship is established for wavelengths such as λ1 and λ2). The frequencies of this beat signal are |v3−v1| and |v3−v2|. In Example 1, as shown in FIGS. 6A and 6B, the beat signal is set so that |v3−v1| is 400 MHz and |v3−v2| is 200 MHz.

Herein, wavelength tuning will be described. The signal generated in the light receiving element 35 is converted from a current component to a voltage component by the I-V circuit 36. Thereafter, only the beat signal components are taken out by the high pass filter 37. The output of the high pass filter 37 is applied to the f-V circuit 39b, where an average frequency thereof is converted into a voltage. Then, the output from the f-V circuit 39b and a predetermined voltage (the voltage corresponding to the average frequency according to the mark ratio obtained by the mark ratio detection circuit 44) are compared with each other by the comparator 40b. Thus, the temperature controller 47 is controlled and the output of the temperature controller 47 is used for controlling the frequency of the local oscillator LD 30 so as to attain wavelength tuning.

The demodulation of the beat signal will be described hereinafter. The band-pass filter 38 transmitting only a beat signal excludes noise components from the other output of the high-pass filter 37. Thereafter, the frequency thereof is converted into a voltage by the f-V circuit 39a. In the demodulation circuit 42, the comparator 40a demodulates the voltage into data of 1 or 0.

On the other hand, with respect to the output through the band pass filter 38, the amplitude thereof is detected by an envelope detection circuit 46. The detected amplitude is subjected to a threshold value processing by the comparator 40c. The resultant signal is input to the discrimination circuit 48.

Furthermore, when the beat signal demodulation circuit 42 receives data of the Mount of 80 Kbits (0.4 msec), the light shutter 50 is driven by a control signal corresponding to the termination of receiving of the group of data, so that the data is transmitted to the transmission side 26. On the transmission side 26, this light signal is received by the light receiving element 25, followed by the transmission of the next data.

At this time, when a Wavelength or wavefront deviation suddenly occurs, the data during that time is lost. In the case where the intensity of the beat signal does not satisfy a predetermined C/N ratio due to causes such as a temperature change during the transmission of the group of data, the light shutter 50 is turned ON or OFF through the discrimination circuit 48 by the control circuit 49, which is a control signal generating circuit. This ON/OFF signal as the control signal changes the intensity of the light from the local oscillation laser 30 in the manner as shown in FIG. 6B. At this time, the information to be transmitted has been encoded.

When receiving this light signal, the receiving side demodulates the encoded signal by a demodulation circuit (not shown), thus knowing the information on the receiving side (in this case, the loss of data caused by the wavelength deviation). Furthermore, the control circuit 26 controls the transmission of the light signal based on the information. The information to be transmitted includes the intensity of the locally oscillated beam obtained e.g. by monitoring the current of the light receiving element (not shown) attached to the local oscillation laser 30 which is a semiconductor laser, the beat signal frequency discrimination state, the beat signal amplitude detection state and the like.

In Example 1, even when the beat signal having a predetermined frequency is not detected by the demodulation circuit 42, the beat signal having a current of several GHz can be detected by the f-V circuit 39b as far as wavelength tuning by about 0.1 nm is obtained. Accordingly, in such a case, it is found that only the wavefront alignment is attained while the wavelength tuning is not attained. In the case of failure in the wavelength tuning, the wavelength tuning operation is performed again by scanning the temperature of the temperature controller 47 for controlling the frequency. In Example 1, the semiconductor laser used in the above operation has a thermal response velocity of 100 KHz, and the operation was accomplished within 0.05 meet. Thereafter, the group of data which could not be transmitted is resent from the data storage 22. After the group of data is resent, the accumulated data is cleared, and the next data is transmitted. In this way, the information transmission from the receiving side to the transmission side is performed once per 0.5 msec, and the pulse width is assured to be sufficiently longer than that of an usual data transmission. Accordingly, this can be efficiently performed by the direct detection method. Actually, the base band modulation method of 1 Mbps was used in Example 1. In addition, the data may include the parity of the transmission data or the like, which allows the data to be resent when a bit error arises.

Thus, in Example 1, the data transmission of 160 Mbps is possible in the case where there is no loss of data, and the data transmission of 80 Mbps is possible in the case where the loss of data arises at a ratio of 1/2.

EXAMPLE 2

Figure 7:
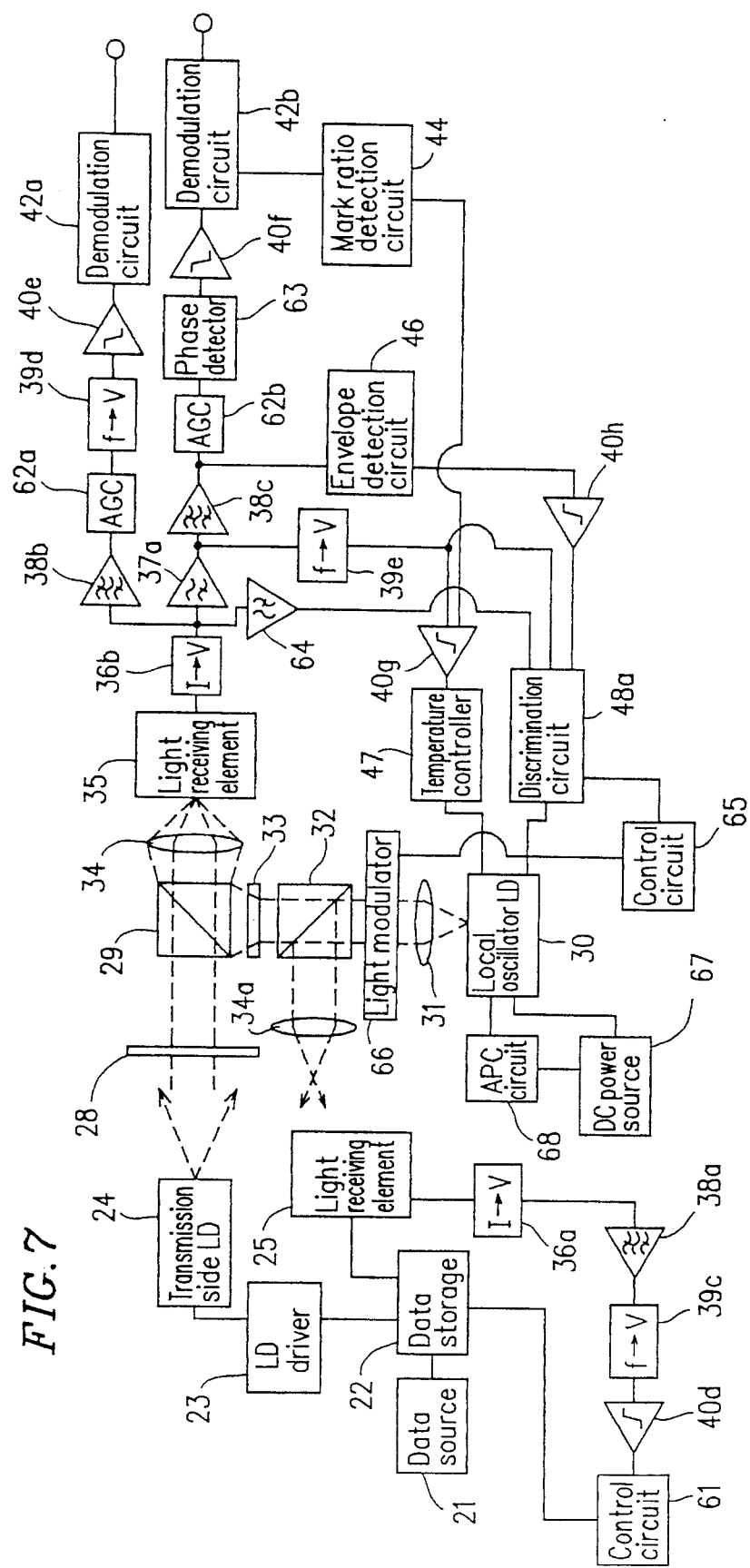
FIG. 7 is a block diagram showing the configuration of the spatial light transmission apparatus of Example 2 of the present invention.

The spatial coherent light transmission apparatus of Example 2 of the present invention will be described with reference to FIG. 7. FIG. 7 is a block diagram showing the spatial coherent light transmission apparatus of Example 2. The components corresponding to those in Example 1 are denoted by the same reference numerals.

As shown in FIG. 7, an I-V circuit 36a, to which a light receiving element 25 is connected, is connected to a data storage 22 via a band pass filter 38a, an f-V circuit 39c, a comparator 40d and a control circuit 61.

Meanwhile, a band pass filter 38b, to which the I-V circuit 36b is connected, is connected to an automatic gain control (AGC) circuit 62a, an f-V circuit 39d, a comparator 40e and a demodulation circuit 42a, for monitoring the control signal. A high pass filter 37a, to which the I-V circuit 36b is connected, is connected to a band pass filter 38c, an AGC circuit 62b, a phase detector 63, a comparator 40f and a demodulation circuit 42b, for detecting the beat signal by means of coherent detection. Furthermore, a low pass filter 64 to which an I-V circuit 36b is connected, an f-V circuit 39e to which the high pass filter 37a is connected and a comparator 40h are connected to a discrimination circuit 48a. Through a control circuit 65, the discrimination circuit 48a is connected to a light modulator 66 intermediately provided between a collimator lens 31 and an optical multiplexer/demultiplexer 32, whereby the light from the local oscillator LD 30 is modulated by the control circuit 65 on the basis of the output from the discrimination circuit 48a. To the local oscillator LD 30, a temperature controller 47 to which the output terminal of a comparator 40g is connected, the discrimination circuit 48a, and an APC (Auto Power Control) circuit 68 are connected, whereby the local oscillator LD 30 is controlled by the output signals. A direct current source 67 for supplying a direct current to the local oscillator LD 30 is connected to the APC circuit 68.

According to the above-mentioned configuration, on the transmission side, a light signal is first output from a transmission side LD 24 by driving an LD driver 23 while accumulating signals from the data source 21 into the data storage 22. At this time, the oscillation wavelength is set at λ1, and the phase of the transmission light is modulated depending on whether the data is 1 or 0 by using a phase modulator (not shown).

Then, on the receiving side, the light having a wavelength of λ3 is emitted by the local oscillator LD 30. The amplitude of the emission light is modulated by a light modulator 66 so as to have the form of a sine wave. That is, the conditions of the receiving side are transmitted to the transmission side by modulating the frequency of this sine wave. The locally oscillated beam is mixed with the signal beam by an optical multiplexer/demultiplexer 29 so as to be incident onto a light receiving element 35. All the current I excited in this light receiving element 35 is expressed as follows:

$I = A \sin(\omega t + \phi 1) \cos(f b t + \phi 2) + \text{(direct current)}$ where ω is the frequency resulting from the frequency modulation of the locally oscillated beam, performed by the light modulator 66 which is an external modulator, and fb is the frequency of the beat signal. As shown in FIG. 8A, the beat signal frequency fb is 200 MHz, and the modulated frequency ω obtained by the light modulator 66 is from 2 to 10 MHz. This signal is subjected to the current to voltage conversion by the I-V circuit 36b, and thereafter is fed to the band pass filter 38b and the high pass filter 37a. The frequency transmission band of the high pass filter 37a is 100 MHz or more, while that of the band pass filter 38b is from 100 KHz to 20 MHz, which are sufficient to separate between the two signals having the above-mentioned frequencies. The signal passed through the band pass filter 38b passes through the AGC circuit 62a, the f-V circuit 39d and the comparator 40e. Then, the signal is demodulated by the demodulation circuit 42a into the original frequency modulated signal obtained by the light modulator 66 so as to monitor the condition of the receiving side itself.

On the other hand, the signal passed through a band pass filter 38c (transmission band: 100 to 300 MHz) via the I-V circuit 36b and the high pass filter 37a has been changed so as to have only beat signal components. As shown in FIG. 8B, this signal becomes the beat signal of a constant intensity in the AGC circuit 62b. Thereafter, the resultant signal is subjected to phase detection by the phase detector 63, so that the original digital data is demodulated via the comparator 40f and the demodulation circuit 42b.

As for wavelength tuning, similar to Example 1, the mark ratio is detected by a mark ratio detection circuit 44. The expected average beat frequency and the output from the frequency discrimination circuit are compared by a comparator 40g. On the basis of the comparison output therefrom, the wavelength tuning operation is performed for the local oscillator LD 30 by the temperature controller 47. At this time, the light emission efficiency of the local oscillator LD 30 varies depending on the temperature. Hence, the APC circuit 68 controls the injection current injected from the direct current source 67 so as to have a constant light power by using the current value of the light receiving element (not shown) attached to the local oscillator LD 30.

Figure 9:
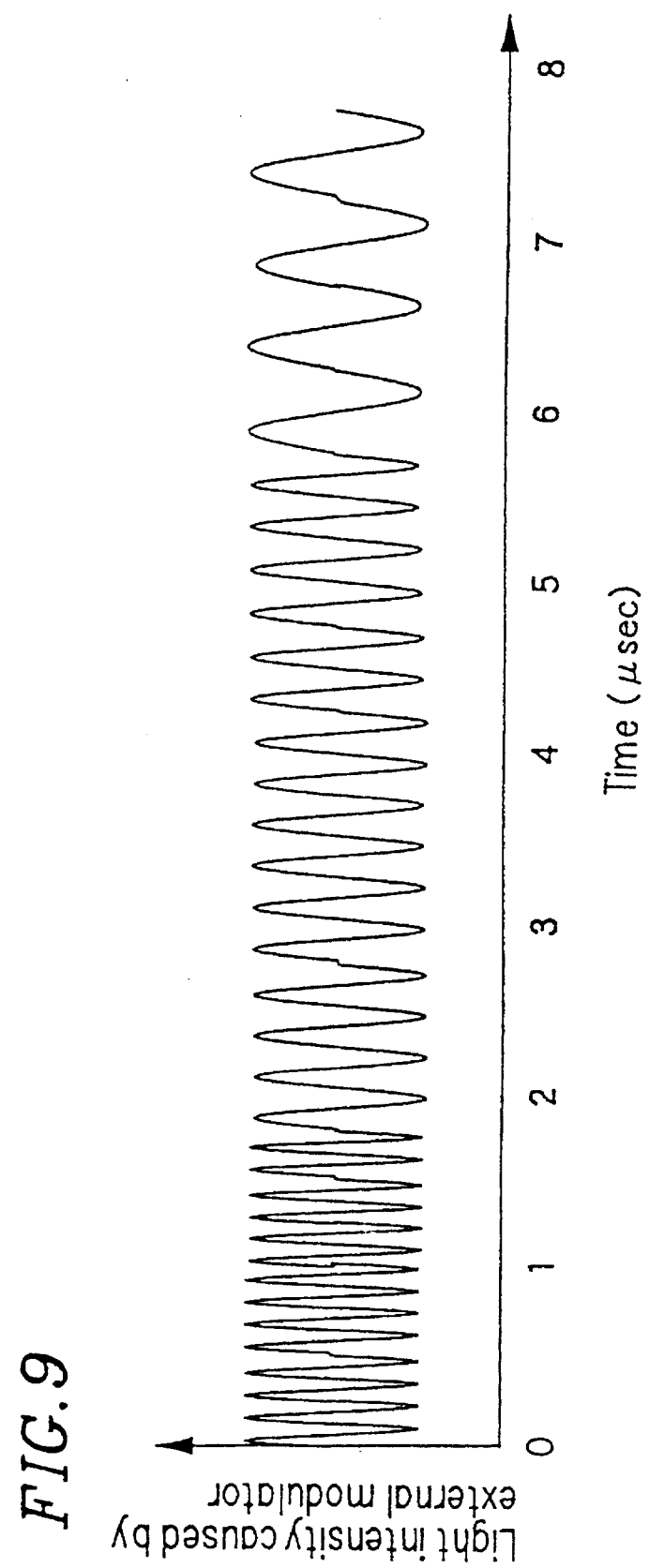
FIG. 9 is a waveform chart showing the control signal in the spatial light transmission apparatus shown in FIG. 7 (light intensity modulated by an external modulator 23).

Furthermore, after the band pass filter 38c, the intensity of the beat signal is judged to be weak or strong by detecting the amplitude of the beat signal by an envelope detection circuit 46. In accordance with the result of the detection, the discrimination circuit 48a drives the control circuit 65 which is the control signal generating circuit. Herein, the beam oscillated by the local oscillator laser LD 30 is modulated by the light modulator 66 via this control circuit Moreover, in Example 2, the direct current components excited in the light receiving element 35 by the local oscillator LD 30, which is a semiconductor laser, can be kept approximately constant by using the APC circuit 68. In the case of using this unit under intense background light (daylight, illumination light, etc.), the components corresponding to an alternating current are removed from the output of the I-V circuit 36b by the low pass filter 64, whereby the intensity of the background light can be monitored. When the background light is too intense, a sufficient C/N ratio is not assured naturally. So, the discrimination circuit 48a informs the transmission side of this condition. The data transmitted to the transmission side in such a case includes the beat signal intensity state (with respect to the wavefront alignment), the beat signal frequency state (the information on the wavelength tuning), the state of the local oscillator LD 30 and the background light intensity. As shown in FIG. 9, the frequency of the frequency modulation signal obtained by the light modulator 66 is changed in accordance with such states.

On the transmission side, the light signal taken out from the optical multiplexer/demultiplexer 32 by the local oscillator LD 30, (the light being loaded with a frequency modulation signal of 1 Mbps by the light modulator 66), is received by the light receiving element 25. The received signal is subjected to the current-voltage conversion processing by the I-V circuit 36a. Thereafter, by a band pass filter 38a having the same characteristics as those of the band pass filter 38b, only signal components are detected from the received signal. Then, the signal is subjected to frequency-voltage conversion by the f-V circuit 39c, and the resultant voltage is compared with a predetermined voltage by the comparator 40d so as to be demodulated. On the basis of the demodulated signal, the control circuit 61 makes judgments with respect to the control of the light signal transmission, such as data transmission, data resending, the cancellation of data transmission etc.

As described in the foregoing, Example 2 permits the receiving side to always inform the transmission side of its states, and to transmit the data also during such informing operation.

EXAMPLE 3

Figure 10:
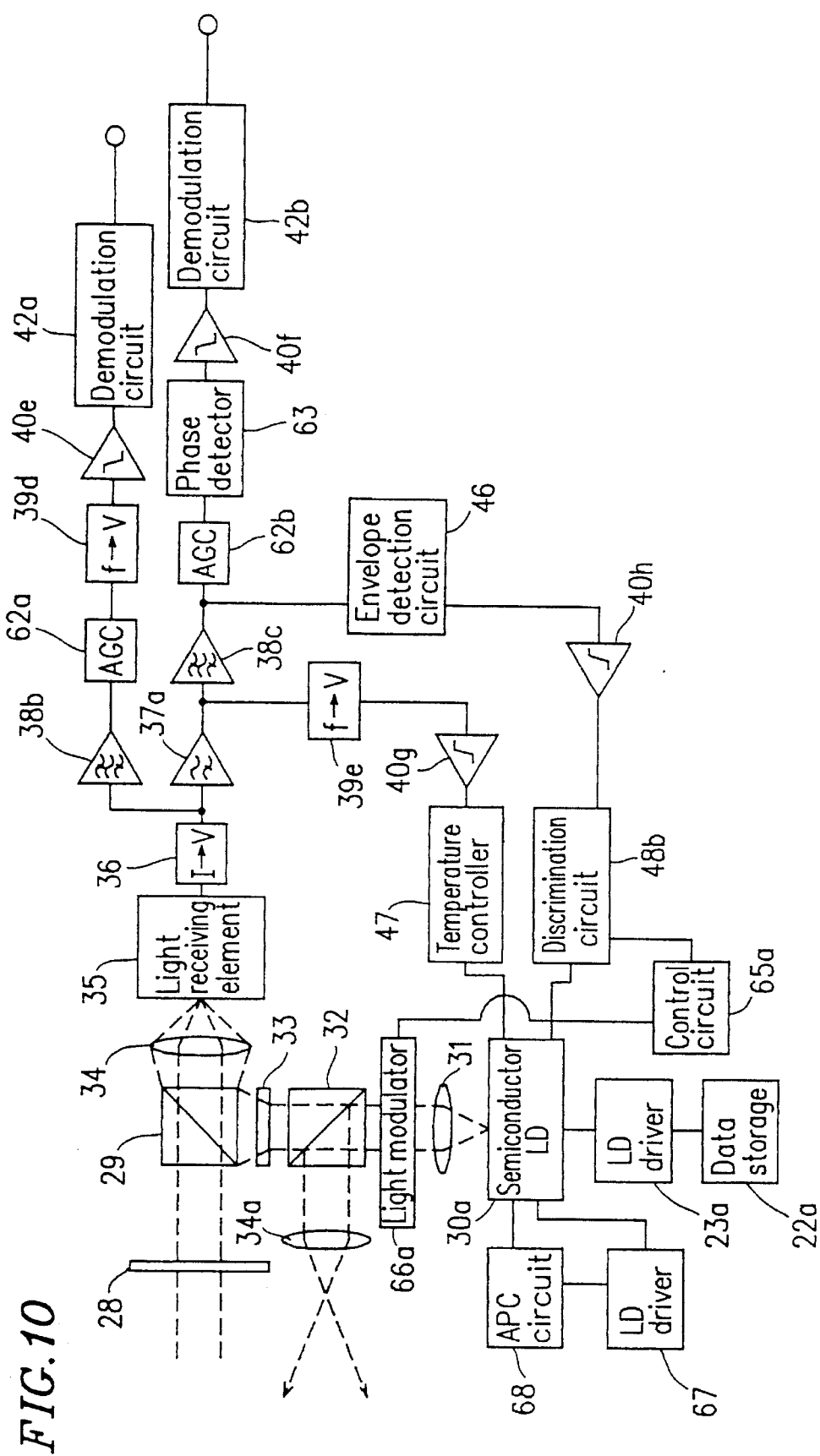
FIG. 10 is a block diagram showing the spatial light transmission apparatus of Example 3 of the present invention.

With reference to FIG. 10, the spatial coherent light transmission apparatus of Example 3 of the present invention will be described. FIG. 10 is a block diagram showing a spatial coherent light transmission apparatus of Example 3. The components corresponding to those in Examples 1 and 2 are denoted by the same reference numerals.

The light transmission apparatus of Example 3 is a light transmission/receiving unit in which a transmitter and a receiver are integrated. As shown in FIG. 10, a data storage 22a is connected to a semiconductor laser diode (LD) 30a via an LD driver 23a. This semiconductor LD 30a is used as an LD for the transmission side, and also as a local oscillator LD. An f-V circuit 39e, to which a high pass filter 37a is connected, is connected to a temperature controller 47 through a comparator 40g. An envelope detection circuit 46, to which a band pass filter 38c is connected, is connected to a discrimination circuit 48b through a comparator 40h. The temperature controller 47 and discrimination circuit 48b are connected to the LD 30a. Furthermore, a control circuit 65a, to which the discrimination circuit 48b is connected, is connected to a light modulator 66a intermediately provided between a collimator lens 31 and an optical multiplexer/demultiplexer 32.

First, the data transmission according to the above-mentioned configuration will be described. The data transmission is performed by a Manchester method. Namely, the signal beam is changed from a high to low level when the signal in the data source is 1, and from a low to high level when it is 0. To the semiconductor LD 30a, a current is injected from the LD driver 23a so as to cause the oscillation wavelength thereof to be λ1 or λ2 depending on whether the signal beam is in the high or low levels. At this time, the light modulator 66a provides no processing, so that the light having a wavelength of λ1 or λ2 is emitted over a given solid angle through the optical multiplexer/demultiplexer 32.

Then, the receiving of data will be described hereinafter. The semiconductor LD 30a oscillates light of a wavelength λ3 which is little different from the signal beam frequencies of λ1 and λ2. The oscillated light is mixed with the signal beam propagated from the transmission side by an optical multiplexer/demultiplexer 29 and is received by the light receiving element 35. Similar to Example 2, the locally oscillated beam from the semiconductor LD 30a has been subjected to frequency modulation by a light modulator 66a. Also in Example 3, the beat signal is demodulated by a demodulation circuit 42b, while the control signal for controlling the receiving side itself, obtained by the light modulator 66a, is demodulated by a demodulation circuit 42a.

Next, wavelength tuning will be described. The average frequency of the beat signal is constant, i.e. $(|v3-v1|+|v3-v2|)/2$, without depending on the mark ratio thereof because a Manchester method is employed in Example 3. Hence, the mark ratio detection circuit 44 as employed in Examples 1 and 2 is unnecessary.

Herein, the transmission side will be described again. On the transmission side, the control beam having a wavelength of λ3 subjected to the external modulation, emitted from the local oscillator LD 30a on the receiving side, is received by a light receiving element 35 via a light filter 28 and an optical multiplexer/demultiplexer 29. On the light receiving element 35, the beat signal caused by the light having wavelength of λ1 or λ2 emitted from itself and the received light having a wavelength of λ3, and the control signal of the receiving side given by the light modulator 66a on the receiving side are detected as the current of the received light. Only the control signal is selected from among them by a band-pass filter 38b and the selected control signal is demodulated in the manner us described In Example 2. Thus, the receiving side can be monitored on the transmission side. Since the wavelength tuning operation is unnecessary on the transmission side, the wavelength tuning circuit may be turned off for the purpose of energy saving. In this way, according to Example 3, the transmission and receiving operations can be performed by using only one device.

EXAMPLE 4

Figure 11:
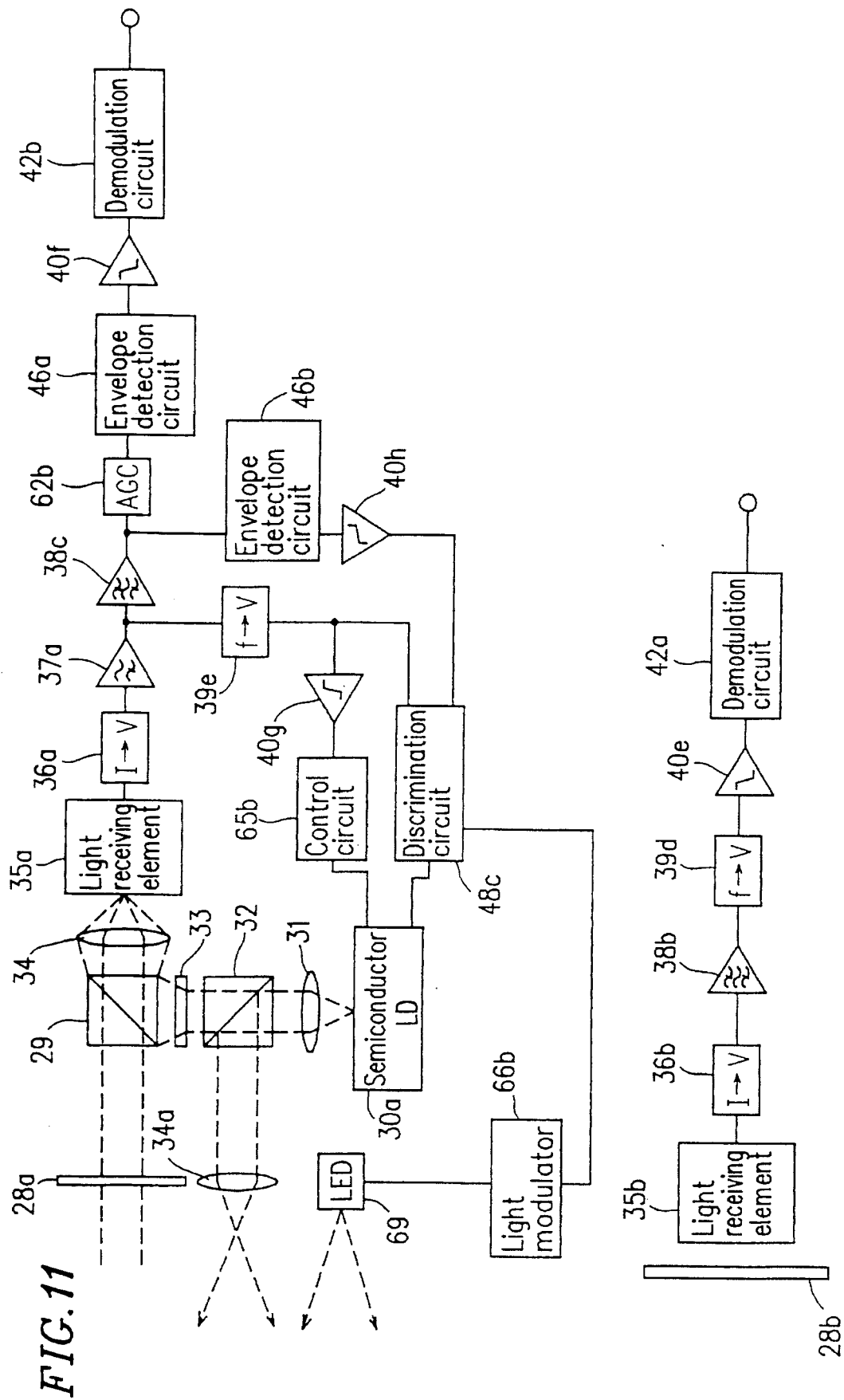
FIG. 11 is a block diagram showing the spatial light transmission apparatus of Example 4 of the present invention.

With reference to FIG. 11, a spatial coherent light transmission apparatus of Example 4 of the present invention will be described. FIG. 11 is a block diagram showing the spatial coherent light transmission apparatus of Example 4. The components corresponding to those in the above-mentioned examples are denoted by the same reference numerals.

The spatial light transmission apparatus of Example 4 is a light transmitting and receiving apparatus. As shown in FIG. 11, an f-V circuit 39e, to which the output terminal of a high pass filter 37a is connected, is connected to a control circuit 65b via a comparator 40g. An envelope detection circuit 46b, to which the output terminal of a band pass filter 38c is connected, is connected to a comparator 40h. The output terminals of the f-V circuit 39e and the comparator 40h and a semiconductor LD 30a are connected to a discrimination circuit 48c for monitoring the detection state of the beat signal and the semiconductor LD 30a. The control circuit 65b and the discrimination circuit 48c are connected to the local oscillator LD 30a. The discrimination circuit 48c is connected also to a control signal LED 69 via a light modulator 66h.

In addition to the series circuit for the coherent detection of the beat signal, consisting of a light receiving element 35a, an I-V circuit 36a, the high pass filter 37a, a band pass filter 38c, an AGC circuit 62b, the envelope detection circuit 46a, a comparator 40f and a demodulation circuit 42b, the series circuit consisting of a light receiving element 35b, provided so as to face a light filter 28b, an I-V circuit 36b, a band pass filter 38b, an f-V circuit 39d, a comparator 40e and a demodulation circuit 42a are provided for monitoring the control signal.

The data receiving operation according to the above configuration will be described. The transmission side (not shown) transmits data by changing the emission intensity of the light having an oscillation wavelength of λ1 depending on whether the data to be transmitted is 0 or 1. On the receiving side, the received signal beam and the diffusion plane waves emitted from itself and having a wavelength of λ3 are mixed by an optical multiplexer/demultiplexer 29 which is a beam splitter, so that the mixed beams are received by the light receiving element 35a. The current flowing through the light receiving element 35a is $A_1\cos(2\pi(\nu1-\nu3)t+\phi)$ when the data is 1, and is $A_2\cos(2\pi(\nu1-\nu3)t+\phi)$ $(A_1>A_2)$ when the data is 0. This current is converted from a current to a voltage by the I-V circuit 36a and then is fed to the AGC circuit 62b through the high pass filter 37a and the band pass filter 38c. Thereafter, the voltage undergoes envelope detection by the envelope detection circuit 46a and further the threshold processing by the comparator 40f, whereby the original digital data is demodulated by the demodulation circuit 42b.

Next, the wavelength tuning operation will be described. In Example 4, a binary electrode DFB laser (wavelength variable laser) is used as the semiconductor LD 30a. Hence, unlike Example 1, the wavelength can be greatly changed (by about 4 nm) only by an injected current without necessitating a controller. Specifically, the beat frequency of the beat signal is converted into a voltage by the f-V circuit 39e, and the voltage is compared with a predetermined voltage (corresponding to |ν3−ν1|) by the comparator 40g. In accordance with the output therefrom, the drive current is changed by the control circuit 65b, whereby the semiconductor LD 30a is controlled.

On the other hand, the output subjected to envelope detection by the envelope detection circuit 46b is compared with a predetermined voltage by the comparator 40h, and then fed to the discrimination circuit 48c. The discrimination circuit 48c performs monitoring of the beat frequency by receiving the output from the f-V circuit 39e as well as the monitoring of the semiconductor LD 30a. This discrimination circuit 48c causes the control signal LED 69 (a center wavelength λ:λ≠λ3, and λ4≠λ1) to emit light by using the light modulator 66b as a driver. This signal is obtained by frequency modulation (sub carrier method) using a modulation frequency of 1 MHz. The transmission side receives this signal, in which the signal undergoes current-voltage conversion and frequency discrimination, so as to be demodulated as the control signal.

Meanwhile, when the wavelength tuning is not attained by controlling the semiconductor LD 30a, this condition can be informed to the transmission side by using the control signal. On receiving this signal, the transmission side can change the oscillation wavelength by controlling the injection current to the semiconductor LD 30a, which is a wavelength variable laser. Thus, the range of temperatures allowing wavelength tuning can be made larger.

In addition, in the case of using the unit of Example 4 on the receiving side, the light receiving element 35b is provided for receiving and demodulating the control signals (including the data on the transmission wavelength, on the trouble of the transmission side LD, etc.) emitted from the transmission side. With respect to the different patterns where the transmission side generates control signals will be described in the following Examples 5 through 7. The light filter 28b is designed to transmit light having the wavelength of the control signal (a center wavelength: λ4) generated from the transmission side. On the other hand, the light filter 28a is designed to cut off light having a wavelength of λ4. Accordingly, light having a wavelength of λ4 can be adjusted so as not to interfere with the locally oscillated beam or the signal beam, by setting the relationship expressed by λ4≠λ3 and λ4≠λ1 as the wavelength of the control signal LED 69. Furthermore, this unit can be used also as the transmitter by modulating the light of the semiconductor LD 30a and taking out the light by an optical multiplexer/demultiplexer 32 which is a beam splitter. In this case, the light receiving element 35b receives the control signal generated from the receiving side. Thus, the data transmission/receiving operation of this unit by coherent detection can be performed for divided time periods, during which the condition of the both sides can be mutually and continuously monitored. In addition, by employing the wavelength variable laser, the system can be configured so as not to necessitate the temperature controller.

EXAMPLE 5

Figure 12:
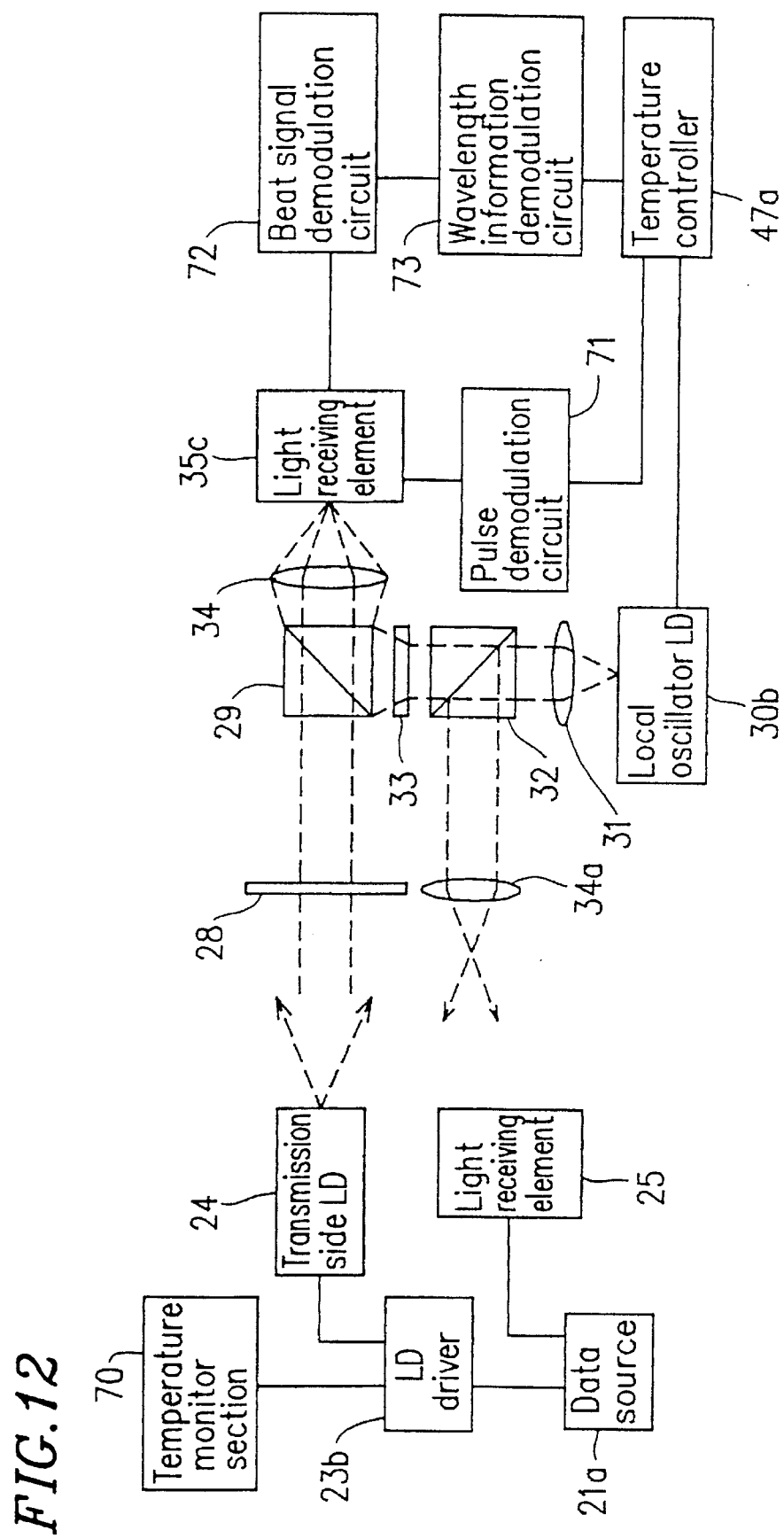
FIG. 12 is a block diagram showing the spatial light transmission apparatus of Example 5 of the present invention.

With reference to FIG. 12, a spatial coherent light transmission apparatus of Example 5 of the present invention will be described. FIG. 12 is a block diagram showing the spatial coherent light transmission apparatus of Example 5. The components corresponding to those in the above-mentioned examples are denoted by the same reference numerals.

The spatial light transmission apparatus of Example 5 is configured so that the transmission side transmits the information of the wavelength of the transmission side itself to the receiving side for attaining the wavelength tuning operation more rapidly. As shown in FIG. 12, a data source 21a, to which a light receiving element 25 is connected, is connected to a transmission LD 24 via an LD driver 23b to which a temperature monitor section 70 is connected. Meanwhile, a light filter 28, an optical multiplexer/demultiplexer 29 and a collective lens 34 are arranged in series, with a light receiving element 35c being disposed so as to face this collective lens 34. This light receiving element 35c is connected to a pulse demodulation circuit 71 and a beat signal demodulation circuit 72. This pulse demodulation circuit 71 is connected to a temperature controller 47a. The beat signal demodulation circuit 72 is connected to the temperature controller 47a through a wavelength information demodulation circuit 73. This temperature controller 47a is connected to a local oscillator LD 30b.

The operation according to the above-mentioned configuration will be described hereinafter.

Figure 13:
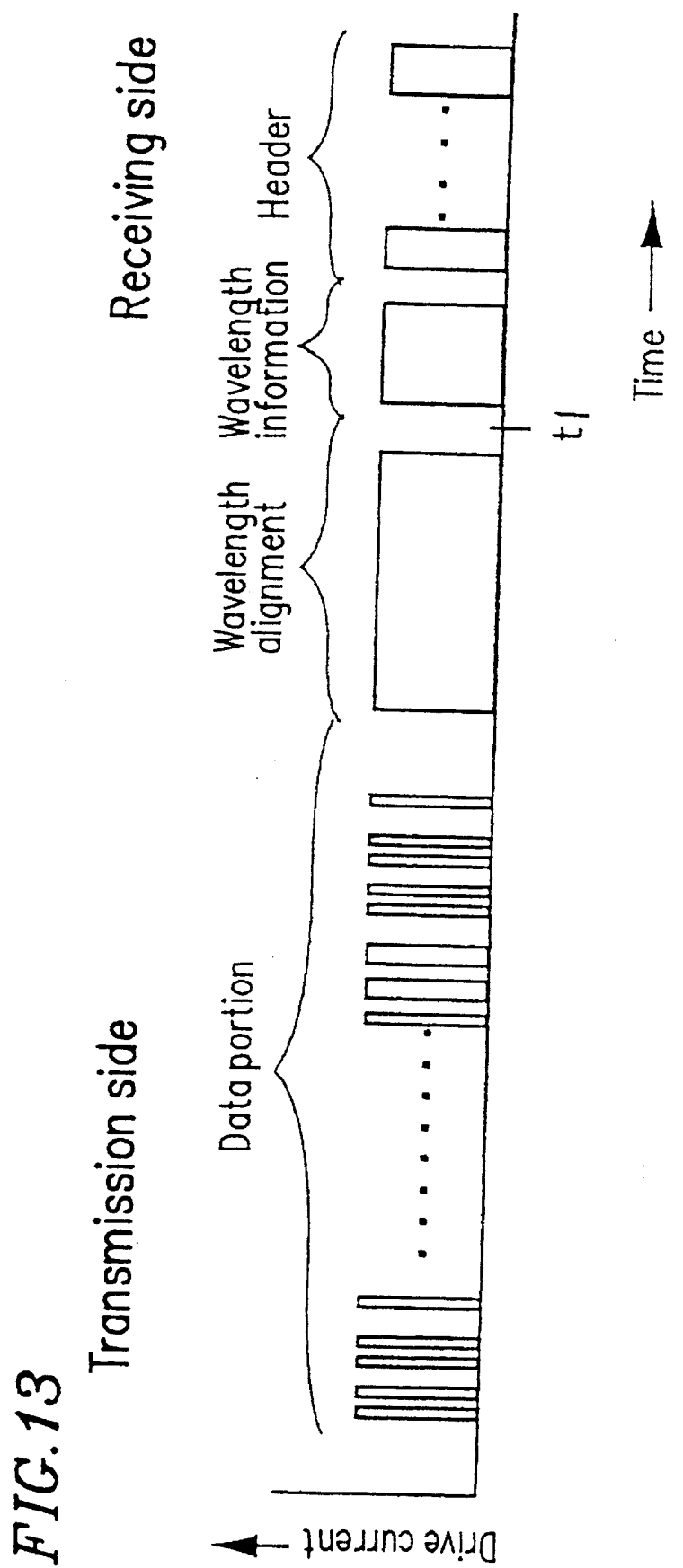
FIG. 13 is a timing diagram in the case where data transmission is performed by using the spatial light transmission apparatus shown in FIG. 12.

FIG. 13 is a timing diagram showing data transmission using the spatial coherent light transmission apparatus shown in FIG. 12.

First, the transmission side monitors the temperature by the temperature monitor 70. The result of the temperature monitoring is fed to the LD driver 23b so as to be encoded into a digital signal, and then the transmission LD 24 is driven by the signal. At this time, as shown in FIG. 13, the light signal from the transmission LD 24 has a header portion in its starting part for informing the receiving side that the temperature information is to be transmitted thereto. Successively, the pulse train representing the temperature as a digital signal is repeatedly transmitted.

On the other hand, the receiving side receives the pulse train and demodulates the temperature information by the pulse demodulation circuit 71. The temperature controller 47a controls the temperature of the local oscillator LD 30b so as to be the same as that of the transmission side LD 24. At this time, the local oscillator LD 30b has not been driven yet. In Example 5, both of the transmission and receiving side LDs are DFB lasers. The difference between the LDs in oscillation frequency at the same temperature is alleviated so as to be within about 1 nm. Accordingly, by keeping the temperatures of the two LDs approximately the same, it becomes possible to make the LDs oscillate light of substantially the same wavelengths.

At a time t1 when the receiving side has detected the temperature of the transmission side and finished controlling the temperature of its LD, the receiving side makes the local oscillator LD 30b oscillate. The oscillated light is taken out by an optical multiplexer/demultiplexer 32, which is a beam splitter, so that the transmission side is informed of the signal waiting condition. After receiving this pulse by the light receiving element 25, the receiving side performs a light emission lasting over a predetermined time (about 0.01 msec) for achieving wavelength tuning on the receiving side. Similar to Example 1, this wavelength tuning, which is not shown, is performed so that the difference between the wavelength of the signal beam and that of the locally oscillated beam satisfy a predetermined relationship. Thereafter, desired data is transmitted from the data source 21a. FIG. 13 shows the data transmission at that time.

Furthermore, on the receiving side, the locally oscillated beam is mixed with the signal beam by using an optical multiplexer/demultiplexer 29. The beat signal having a frequency corresponding to a little difference of frequency between the mixed two beams is excited in the light receiving element 35c, which is demodulated in the beat signal demodulation circuit 72. Furthermore, in order to prevent the wavelength tuning from deviating during the communication, the temperature controller 47a is controlled so that the beat signal of a specific frequency can be always detected by a wavelength information demodulation circuit 73 which is a wavelength tuning circuit. Thus, the local oscillator LD 30g is controlled. Accordingly, wavelength tuning for communication between the places with a relatively large difference of temperature can be achieved more rapidly.

EXAMPLE 6

Figure 14:
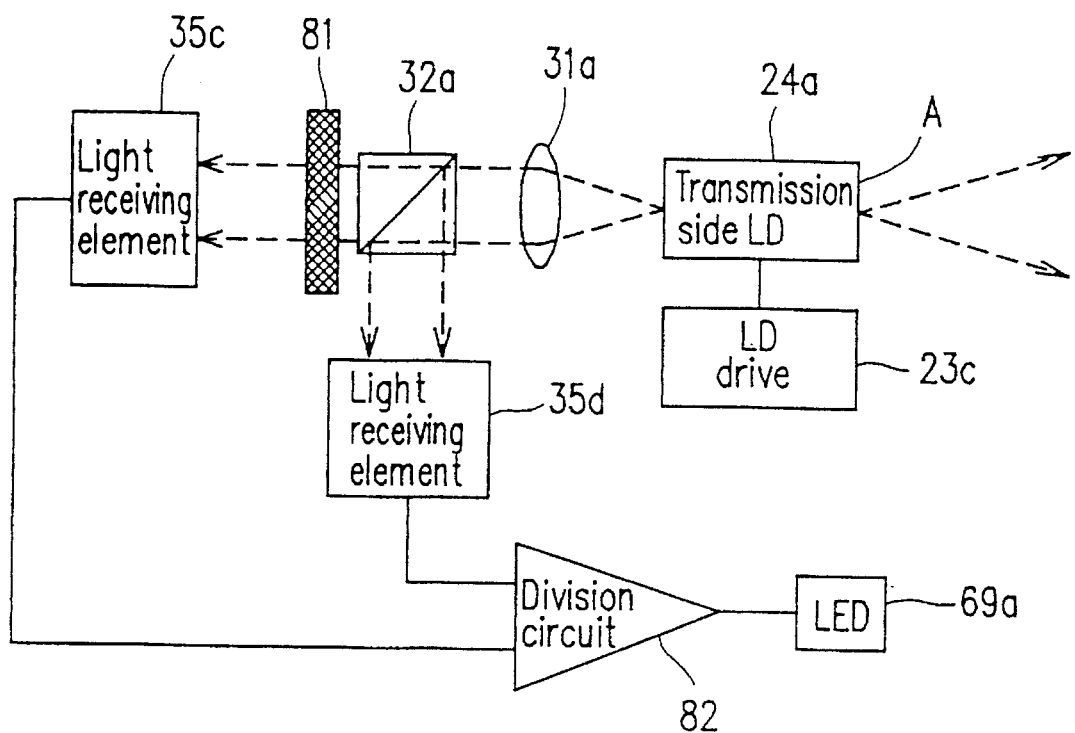
FIG. 14 is a block diagram showing the configuration of the light transmission section in the spatial light transmission apparatus of Example 6 of the present invention.

With reference to FIG. 14, a spatial coherent light transmission apparatus of Example 6 of the present invention will be described. FIG. 14 is a block diagram showing only a part of the transmission side, that is, the light transmission section in the spatial coherent light transmission apparatus of Example 6.

As shown in FIG. 14, an optical multiplexer/demultiplexer 32a and a light filter 81 are arranged in series so as to face the rear face of a transmission side LD 24a, which is a laser diode, via a collimator lens 31a. A light receiving element 35c is arranged so as to face the light filter 81. Also, a light receiving element 35d is arranged along the vertical direction with respect to the serial arrangement direction of the collimator lens 31a, optical multiplexer/demultiplexer 32a and light filter 81 so as to face the optical multiplexer/demultiplexer 32a. A division circuit 82, to which these light receiving elements 35c and 35d are connected, is connected to a control signal LED 69a.

Figure 15:
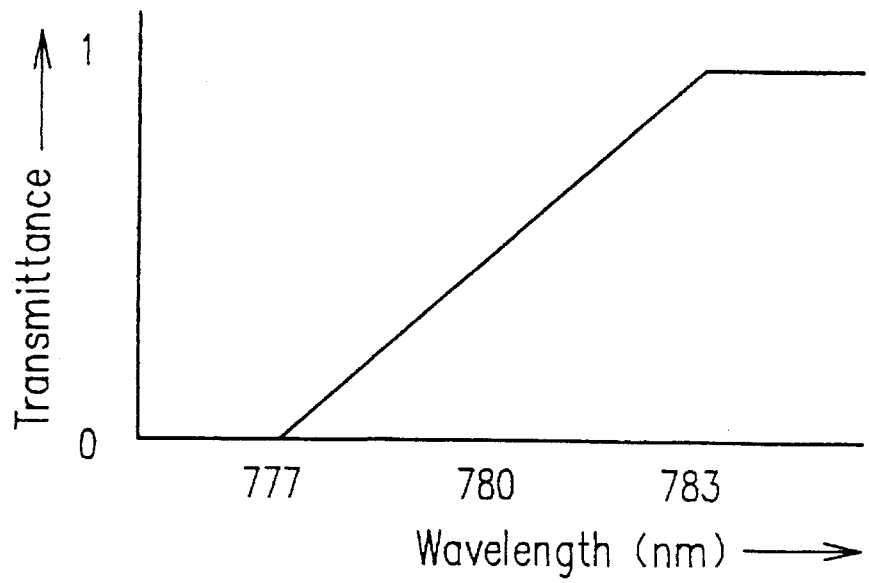
FIG. 15 is a diagram showing the transmission characteristics of a light filter in the spatial light transmission apparatus shown in FIG. 14.

According to the above-mentioned configuration, the transmission side transmits light without changing the oscillation wavelength thereof. The light output from the rear face of the transmission beam emission face A of the transmission side LD 24a is vertically divided in a 1:1 ratio by the optical multiplexer/demultiplexer 32a, which is a beam splitter. Then, one part of the light divided by the optical multiplexer/demultiplexer 32a is incident onto the light filter 81 having transmission characteristics as shown in FIG. 15. The light output from the light filter 81 is received by the light receiving element 35c. The other part of the divided light is directly received by the light receiving element 35d. The photocurrents excited in the light receiving elements 35c and 35d are converted into voltages by I-V circuits (not shown) and thereafter supplied to the division circuit 82. Then, the digital signal in accordance with the result of the division calculation is transmitted through the control signal LED 69a. Naturally, the light signal as the data signal has been transmitted from the transmission beam emission face A of the transmission side LD 24a.

On the receiving side, for which the receiving section as shown in FIG. 11 is used, the light emitted from the control signal LED 69a is received by the light receiving element 35b shown in FIG. 11. On the other hand, the signal beam emitted from the transmission beam emission face A of the transmission side LD 24a is demodulated on the receiving side by means of coherent detection. Also in Example 6, the DFB laser of a wavelength of 780 nm is used as the laser diode of the transmission side LD 24a. The oscillation wavelength of the DFB laser changes along with temperature at the rate of about 0.06 nm/°C. Hence, the transmission characteristics of the light filter 81 are adjusted so that the wavelength tuning is achieved at temperatures in the range of 0° to 60° C. Actually, this was realized by costing derivant thin films in a multi-layered form on a glass substrate.

EXAMPLE 7

Figure 16:
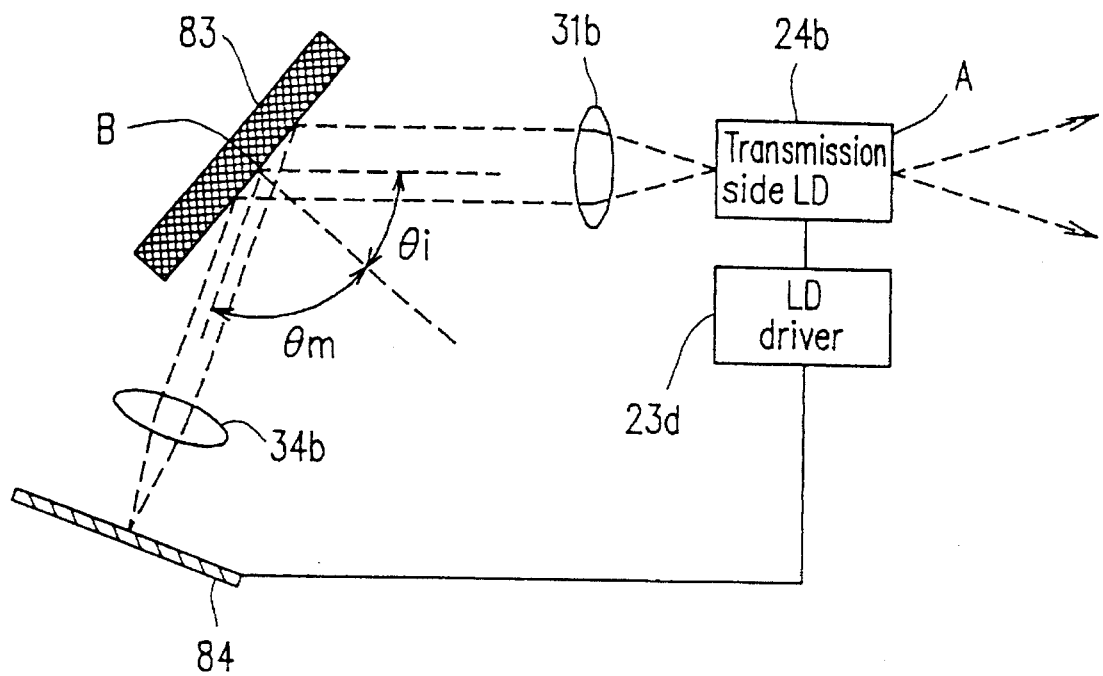
FIG. 16 is a block diagram showing the light transmission section in the spatial light transmission apparatus of Example 7 of the present invention.

With reference to FIG. 16, a spatial coherent light transmission apparatus of Example 7 of the present invention will be described. FIG. 16 is a block diagram showing the spatial coherent light transmission apparatus of Example 7.

As shown in FIG. 16, a transmission side LD 24b, to which an LD driver 23d is connected, emits signal beams from its front and rear faces. A collimator lens 31b is disposed so as to face the rear face of the transmission side LD 24b. A diffraction grating plate 83, onto which a parallel beam from the collimator lens 31b is incident, is disposed so that the incident angle becomes a predetermined angle. Then, a light receiving element array 84 is disposed through a collective lens 34b for collecting the beam reflected from the diffraction grating plate 83. The output terminal of this light receiving element array 84 is connected to the LD driver 23d.

A method for knowing the oscillation wavelength of the transmission side LD on the transmission side according to the above-mentioned configuration will be described hereinafter.

After the beam output from the rear face of the transmission side LD 24b is shaped into a parallel beam by the collimator lens 31b, the parallel beam is caused to be incident onto the diffraction grating plate 83 with a pitch of $\Lambda$ at an incident angle of $\theta_i$. At this time, the m-th order diffraction beam satisfies the relationship expressed by $\Lambda(\sin\theta_m + \sin\theta_i) = m\lambda$, where $\theta_m$ stands for a diffraction angle. For example, where the wavelength $\lambda = 780$ nm, the pitch $\Lambda = 460$ nm and $\theta_i = 45°$, the diffraction angle $\theta_m$ of the first-order diffraction beam is 81°. The wavelength dependency of this diffraction angle $\theta_m$ is expressed as $\Delta\theta_m = m \cdot \Lambda\lambda/\Lambda/\cos\theta_m$. Namely, when the wavelength $\lambda$ changes by ±0.1 nm, $\Delta\theta_m = 0.084°$. In Example 7, this first-order diffraction beam is collected on the light receiving element array 84 by the collective lens 34b. At this time, in the case where the optical center point B of the diffraction grating plate corresponds to the focal length of the collective lens 34b and the length is 15 nm, the change of the position corresponding to $\Delta\theta_m = 0.084°$ becomes $\Delta x = 22$ μm. Accordingly, the apparatus of Example 7 is arranged so that the pitch of the light receiving element in the form of an array is set at 20 μm and that the oscillation wavelength of the laser serving as the transmission side LD 24b can be detected with accuracy on the order of about 0.1 nm.

By using such a light receiving element, the electric capacity of each light receiving element can be significantly reduced. As a result, a response speed of about 10 GHz can be realized. The detected wavelength is converted into a digital signal by the LD driver 23d, and is transmitted to the receiving side as wavelength information. The method for transmission is not specifically described, but it can be easily carried out on the basis of techniques described in the foregoing examples.

In this way, in Example 7, wavelength tuning can be attained with an accuracy of ±0.1 nm. In the case of performing the coherent light detection in this condition, the beat signal current is not detected if the wavefront alignment is not attained. If so, first, the wavefront alignment is attempted. When the wavefront alignment is attained, the beat signal current is detected. Then, the wavelength tuning is performed by controlling the local oscillator LD so that a predetermined relationship holds between the frequency of the signal beam and that of the locally oscillated beam. In this way, the process for the wavefront alignment and the wavelength tuning can be determined.

Thus, the spatial coherent light transmission apparatus of the foregoing examples include the following structures:

(1) the structure of: providing the transmission side with a temperature sensor or a wavelength detector for detecting the oscillation wavelength of this side and a light emission device making the light intensity variable, thus realizing an arrangement for emitting the detected wavelength information into the space by modulating the light intensity; and providing the receiving side with an arrangement for receiving and demodulating the intensity modulated light.

(2) the structure of: providing the receiving side with an arrangement for detecting the frequency or intensity of the electric signal obtained by coherent detection or a direct current arising over the entire light receiving element, a light emission device making the light intensity variable or an arrangement for emitting the information of the detected condition into the space by modulating the light intensity; and providing the transmission side with an arrangement for receiving and demodulating the intensity modulated light.

EXAMPLE 8

Figure 17:
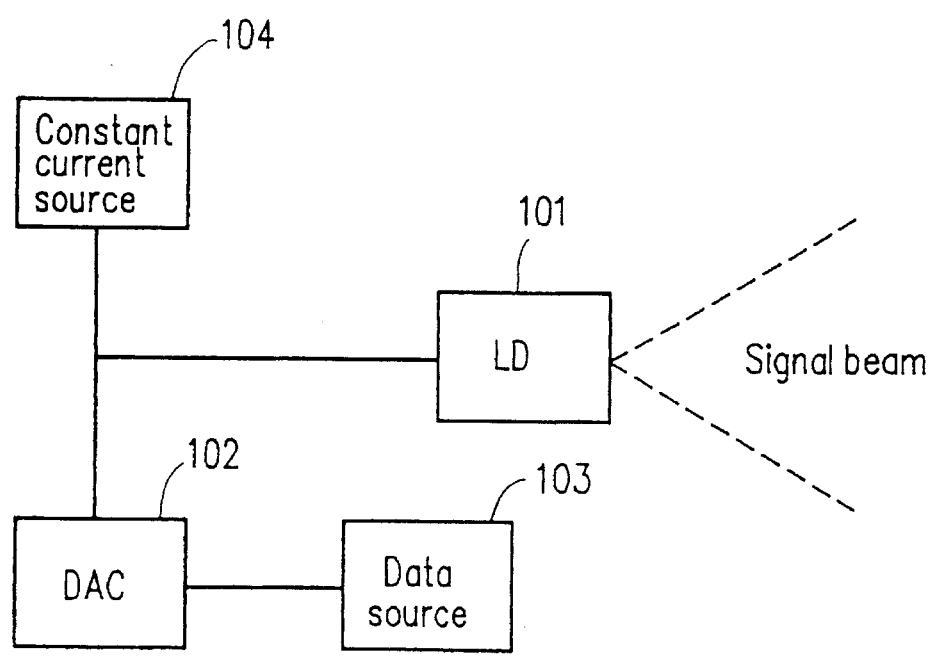
FIG. 17 is a block diagram showing the transmission section in the spatial light transmission apparatus of Example 8 of the present invention.
Figure 18:
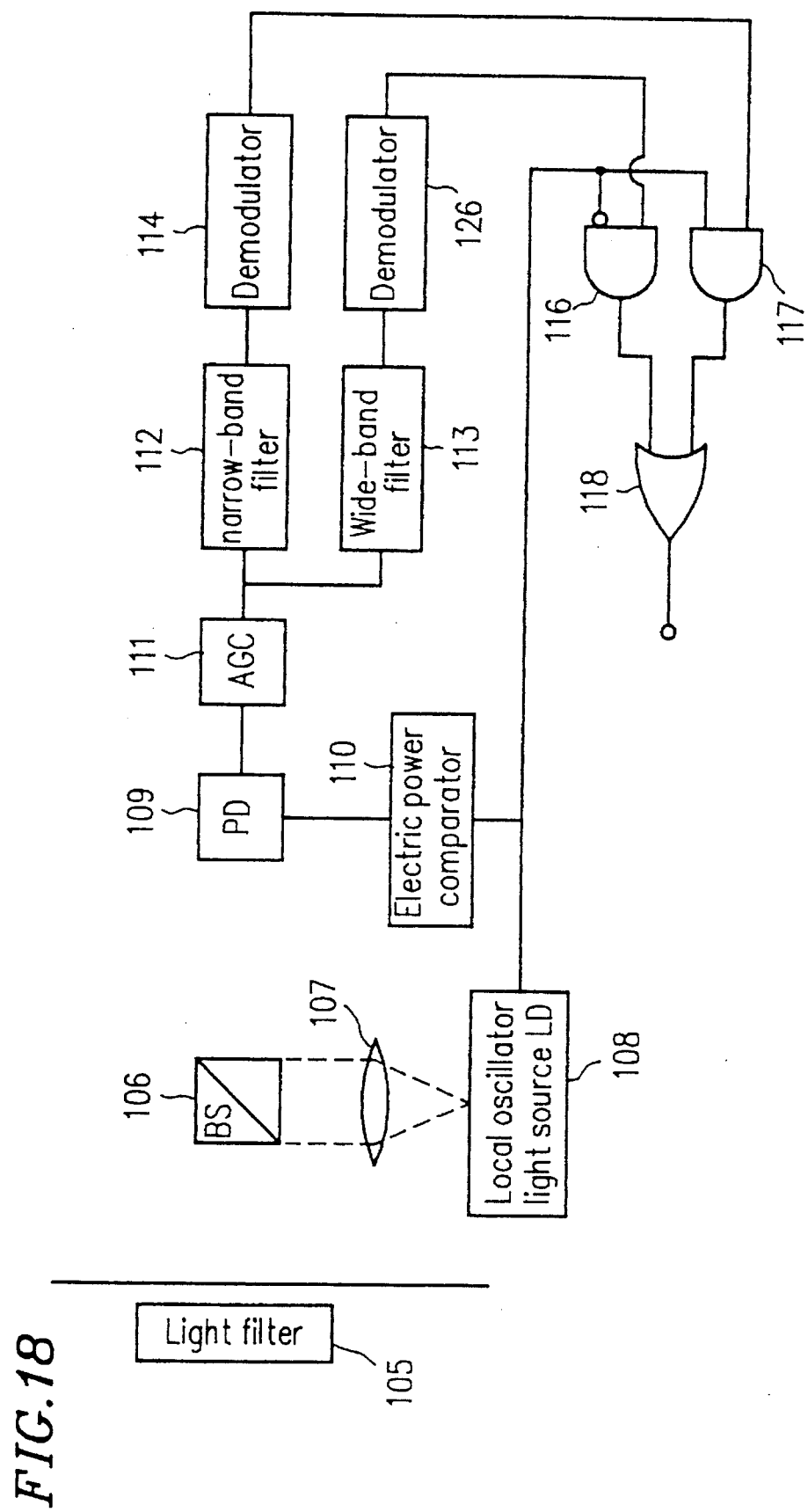
FIG. 18 is a block diagram showing the receiving section in the spatial light transmission apparatus of Example 8 of the present invention.

With reference to FIGS. 17 and 18, a spatial light transmission apparatus of Example 8 of the present invention will be described.

First, the transmission section shown in FIG. 17 will be described.

The transmission section is composed of a semiconductor laser 101 serving as a local oscillator light source, a data source 103 storing digital data, a D/A convertor (DAC) 102 for converting a digital signal into an analog signal, and a constant current source 104 for supplying a power source to the semiconductor laser 101 and the D/A convertor 102.

A GaAs type DFB-LD is used as the semiconductor laser 101 having an oscillation wavelength of 830 nm, a light power of 100 mW, an amplitude of 500 KHz and a diffusion angle of ±30 degrees. This condition is the light intensity of the maximum power of a laser beam permissible within the safety standard regulated by JIS.

Figure 19A:
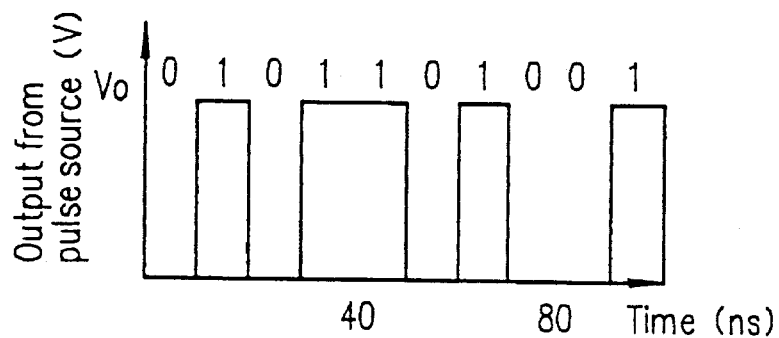
FIGS. 19A through 19C are diagrams for explaining the modulation method for use in Example 8 of the present invention.

When the data output from a data source 103 changes as shown An FIG. 19A and outputs a pulse train of 0, 1, the signal is converted by the D/A convertor 102 into a voltage suitable for driving the semiconductor laser 101. The data source 103 is capable of transmitting data of 100 Mbit/s.

Figure 19B:
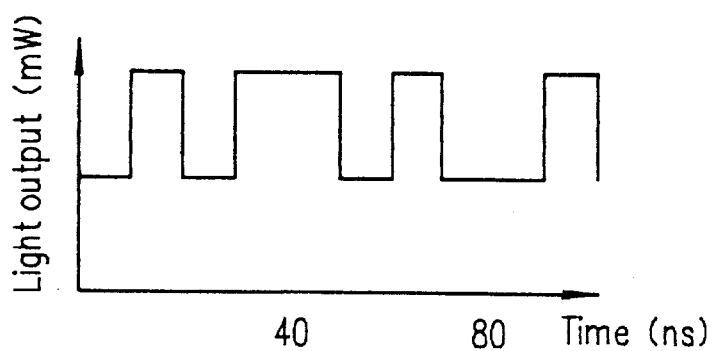
Figure 19C:
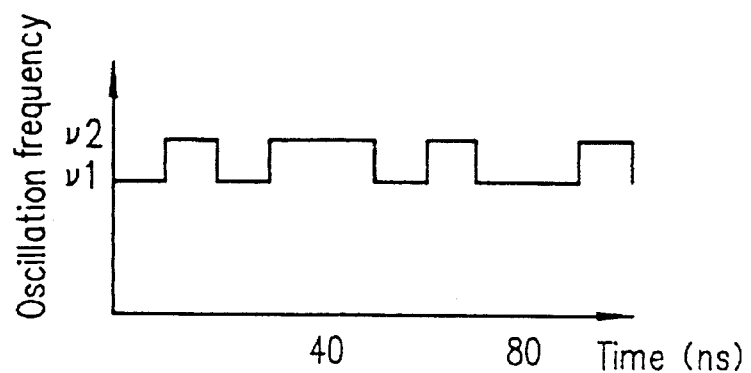

The semiconductor laser 101 is supposed to be oscillated by means of the constant current source 104 regardless of the output from the D/A convertor 102. The light output therefrom is as shown in FIG. 19B. At this time, the frequency of the oscillated beam of the semiconductor laser also changes in accordance with the injected current, as shown in FIG. 19C.

Then, the light receiving section shown in FIG. 18 will be described.

The light receiving section is composed of an optical section and an electric processing section. The optical section includes a light filter 105, a local oscillator light source semiconductor laser 108, a collimator lens 107, an optical multiplexer (BS) 106 and an avalanche photodiode (PD) 109. The light filter 108 reduces the background light. The local oscillator light source semiconductor laser 108 generates a locally oscillated beam. The collimator lens 107 converges the light from the local oscillator light source semiconductor laser 108. The optical multiplexer 106 mixes the light transmitted through the light filter 105 and the light from the collimator lens 107. The avalanche photodiode (PD) 109 receives the light from the optical multiplexer 106 and converts it into an electrical signal.

The electric processing section includes an automatic gain controller (AGC) 111, a narrow-band filter 112 with a transmission band width of 1 MHz, a wide-band filter 113 with a transmission band width of 200 MHz, a demodulator (DEM) 114, a demodulator (DEM) 126, an electric power comparator 110 and logic circuits 116 through 118. The AGC 111 adjusts the level of the signal supplied from the PD 109. The narrow-band filter 112 transmits only the components of a predetermined band width of 1 MHz from among the signals supplied from the AGC 111. The DEM 114 demodulates the signal transmitted through the narrow-band filter 112 into a digital signal. The wide-band filter 113 transmits only the signals of a band width of 200 MHz from among the signals supplied from the AGC 111. The DEM 126 demodulates a digital signal from the signal supplied from the wide-band filter 113. The electric power comparator 110 compares the value of the electric power supplied from the PD 109 and a predetermined value. The outputs of the DEMs 114 and 125 and the electric power comparator 110 are input to the logic circuits 116 through 118.

On the receiving side, an incident signal beam passes through the light filter 105 for reducing the background light. The passed light is incident onto the PD 109 via the optical multiplexer 106. Herein, in the case of Example 8, the light receiving face is of a diameter of 2 mm, and the amplification magnification is 100.

The photocurrent excited in the PD 109 at this time becomes the direct current part plus the pulse part, similar to the case shown in FIG. 19B. Only the direct current part thereof is input to the electric power comparator 110.

The electric power comparator 110 outputs a digital signal of 1 when the input electric power is −45 dBm or less. Thus, the local oscillator light source semiconductor laser 108, using a semiconductor laser similar to that for the semiconductor laser 101, is caused to oscillate so that the coherent detection mode is selected. Then, the incident light of the optical multiplexer 106 and the light output from the local oscillator light source laser diode 108 are mixed by the optical multiplexer 106.

The electric power value of −45dBm is equivalent to the case where the distance between the transmission section and the receiving section is about 0.7 m, though varying depending on the intensity of the background light or the like.

On the other hand, when the input electric power is more than −45 dBm, the electric power comparator 110 outputs a digital signal of 0. Thus, the local oscillator light source laser diode 108 is not caused to oscillate, so that the direct detection mode is selected.

At the time of the coherent detection mode, the oscillation wavelength of the locally oscillated beam is |v3−v1|, which corresponds to several tens GHz, so that it cannot be detected by the avalanche PD 109.

When the data is 1, the beat signal having frequency of |v3−v2| is detected.

The alternating current part, obtained by subtracting the direct current part from the output of the avalanche PD 109, is demodulated into an original digital signal via the AGC 111 by the narrow-band filter 112 with a transmission band width of 1 MHz and the DEM 114.

Herein, provision of the function of aligning the traveling direction of the signal beam and that of the locally oscillated beam allows the more effective coherent detection.

On the other hand, at the time of direct detection mode, the pulse part similarly obtained by subtracting the direct current part from the output of the PD 109, is demodulated into an original digital signal via the AGC 111 by the wide-band filter 113 with a transmission band width of 200 MHz and the DEM 126.

The output of the electric power comparator 110 is connected to the reversal input terminal of the logic circuit 116 and one input terminal of the logic circuit 117. The output of the DEM 114 is connected to the other input terminal of the logic circuit 116. The output of the DEM 126 is connected to the other input terminal of the logic circuit 117. Thus, the output from the logic circuits 116 and 117 are both input to the logic circuit 118.

When the power of the signal beam is large, the electric signal arising due to the intensity modulation of the transmission light (baseband modulation) is demodulated by the circuit composed of the AGC 111, the wide-band filter 113 and the DEM 126. At this time, a digital signal of 0 has been output from the electric power comparator 110, and the logic circuit 116 is turned ON by the signal from the DEM 126. The output from the DEM 126 is connected to the other input terminal of the logic circuit 117. Thus, the data signal is output from the logic circuit 118.

On the other hand, when the power of the signal beam is small, the beat signal caused by the locally oscillated beam and the signal beam is demodulated by the AGC 111, the narrow-band filter 112 and the DEM 114. At this time, a digital signal of 1 has been output from the electric power comparator 110, and the logic circuit 117 is turned ON by the signal from the DEM 114. Thus, the data signal is output from the logic circuit 118.

The spatial light transmission apparatus of the above-mentioned configuration assures an S/N ratio of 20 dB or more even in the communication with a distance of 0 to 10 m between the transmission section and the receiving section.

Figure 20:
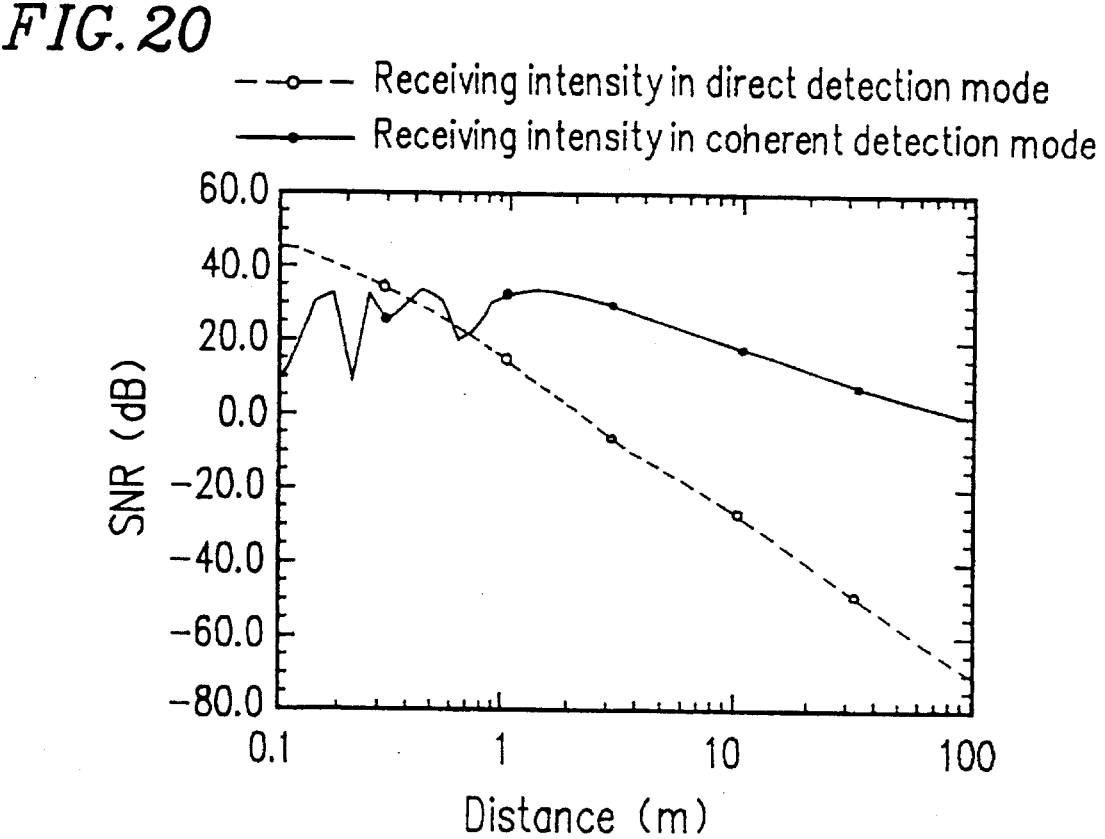
FIG. 20 is a graph showing one example of actually measured values in Example 8 of the present invention.

FIG. 20 shows one example of the actually measured values of S/N ratio. As is apparent from FIG. 20, in the case of the communication over a distance of about 1 m, an optimum transmission was assured by switching direct detection to coherent detection. Example 8 allows the transmission in which the receiving side has a simple configuration for switching transmission mode between the direct detection and the coherent detection, instead of switching the transmission mode on the transmission side.

Thus, the transmission side can transmit the data regardless of the conditions of the receiving side, while the receiving side can select the most appropriate receiving method.

EXAMPLE 9

Figure 21:
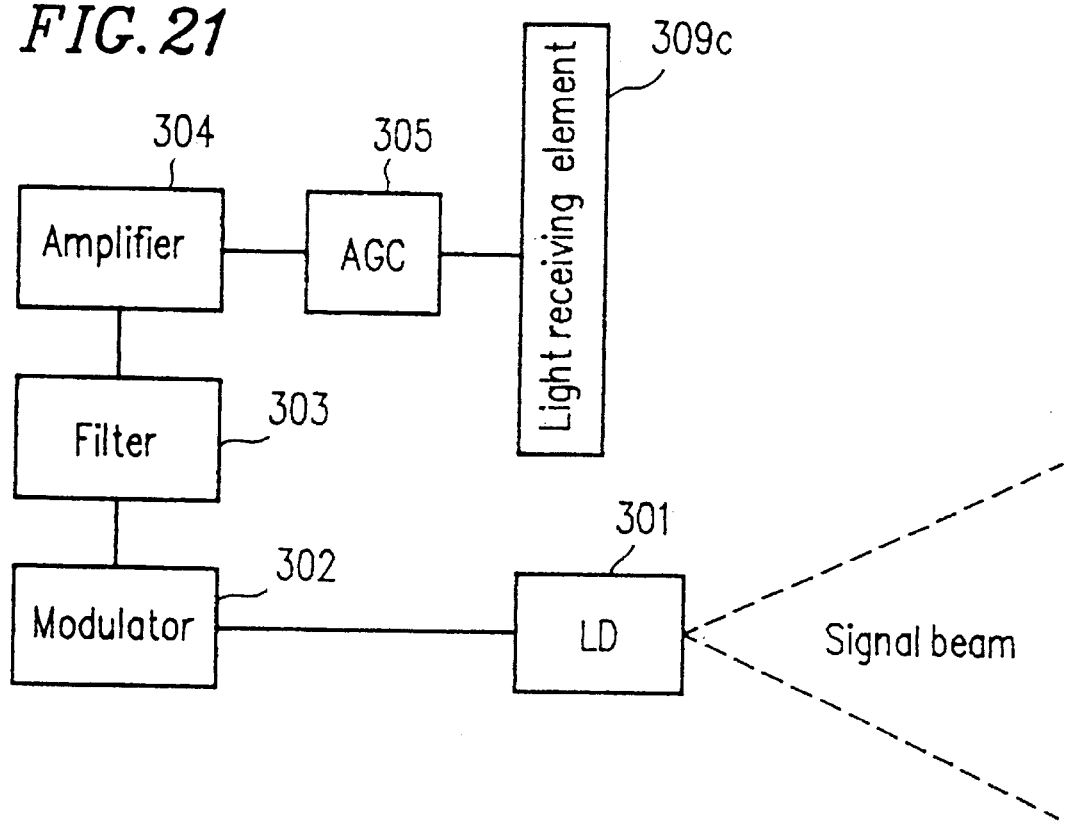
FIG. 21 is a block diagram showing the transmission section in the spatial light transmission apparatus of Example 9 of the present invention.
Figure 22:
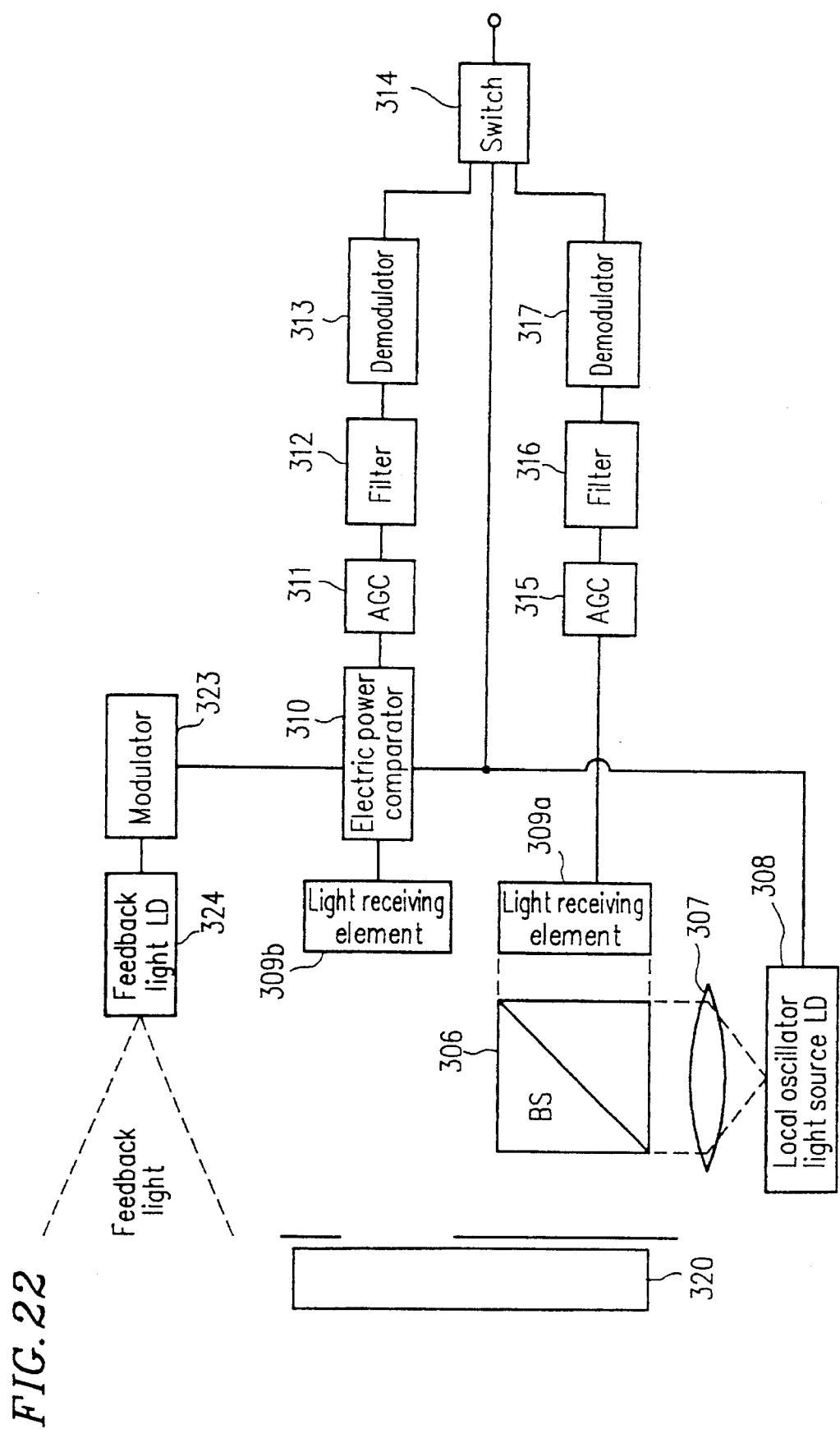
FIG. 22 is a block diagram showing the receiving section in the spatial light transmission apparatus of Example 9 of the present invention.

With reference to FIGS. 21 and 22, the spatial light transmission apparatus of Example 9 of the present invention will be described.

FIG. 21 is a block diagram showing the light transmission section of the spatial light transmission apparatus of Example 9, and FIG. 22 is a block diagram showing the light receiving section thereof.

Also in Example 9, data transmission is performed at 100 Mbit/s, and similar to Example 8, a semiconductor laser (LD) 301 is used as the transmission light source. The intensity of light emission is 80 mW and the light is emitted in space over an angle of ±30°.

As shown in FIG. 21, the transmission side is composed of the semiconductor laser 301, a light receiving element 309c, an automatic gain controller 305, an amplifier 304, a filter 303 and a modulator 302. The semiconductor laser 301 transmits a signal beam. The automatic gain controller 305 is connected to the light receiving element 309c and adjusts the level of an input signal therefrom. The amplifier 304 amplifies the signal input from the automatic gain controller 305. The filter 303 filters the signal input from the amplifier 304. The modulator 302 modulates the signal transmitted from the semiconductor laser 301 by using the signal input from the filter 303.

As shown in FIG. 22, the receiving side is composed of a light filter 320, a coherent detection light receiving element 309a, a direct detection light receiving element 309b, an electric power comparator 210, an automatic gain controller 311, a filter 312, a demodulator 313, a local oscillator light source laser 308, a lens 307, an optical multiplexer (BS) 306, a coherent detection light receiving element 309a, an automatic gain controller 315, a filter 316, a demodulator 317, a switch 314, a modulator 323 and a feedback light laser 324.

The light filter 320 cuts off the background light. The coherent detection light receiving element 309a receives the light transmitted through the light filter 320. The electric power comparator 310 is connected to the light receiving element 309a. The automatic gain controller 311 adjusts the level of the signal input from the electric power comparator 310. The filter 312 filters the signal input from the automatic gain controller 311. The demodulator 313 demodulates the signal input from the filter 312. The local oscillator light source laser 308 generates the locally oscillated beam. The lens 307 converges the light output from the local oscillator light source laser 308. The optical multiplexer 306 mixes the light input from the light filter 320 and the light input from the lens 307. The light receiving element 309a receives the light from the optical multiplexer 306. The automatic gain controller 315 receives the signal from the coherent detection light receiving element 309a. The filter 316 filters the signal input from the automatic gain controller 315. The demodulator 317 demodulates the signal supplied from the filter 316. The switch 314 receives a switching signal from the electric power comparator 310 and outputs either the signal from the demodulator 313 or the signal from the demodulator 317. The modulator 323 receives and demodulates the output from the electric power comparator 310. The feedback light laser 324 performs the output of the feedback light modulated by the modulator 323.

Herein, the outputs of the coherent detection light receiving element 309a and the direct detection light receiving element 309b are amplified as high as one hundred times by an avalanche photodiode.

The signal beam transmitted from the semiconductor laser 301 of the transmission section transmits through the light filter 320 cutting off the background light, and then is incident onto the coherent detection light receiving element 309a and the direct detection light receiving element 309b.

In the case where the input signal beam is of −50 dBm or more (equivalent to a distance of 2.2 m), the electric power comparator 310 supplies a control signal to the switch 314 so as to perform the direct detection. In this case, in order to feedback the electric power received by the direct detection light receiving element 309b to the transmission side, the output of the comparator 310 is modulated into a feedback signal by the modulator 323 so as to drive the feedback light laser 324.

This data can be efficiently transmitted by a low speed transmission. Accordingly, the transmission side can demodulate it by direct detection with a satisfactory S/N ratio.

Figure 23:
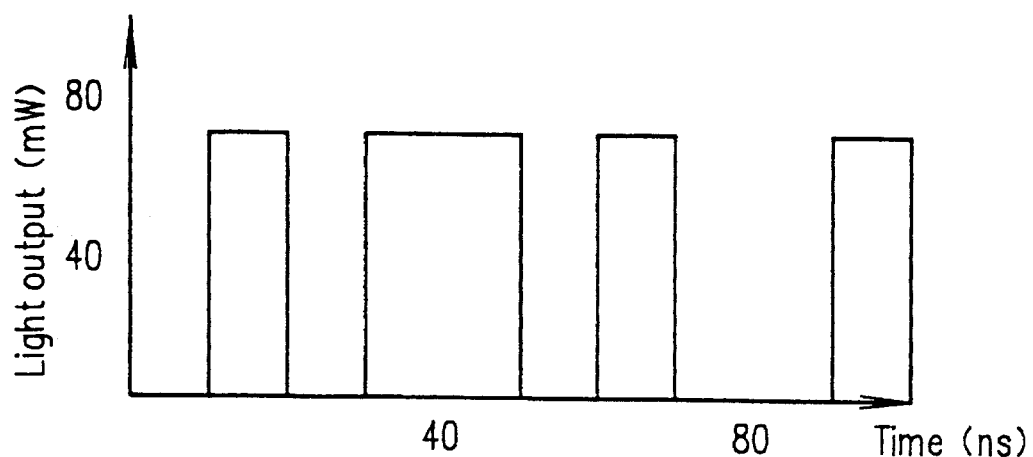
FIG. 23 is a diagram for explaining the modulation method for use in Example 9 of the present invention

In Example 9, in the case where the receiving electric power is strong, the transmission side transmits data by a baseband modulation as shown in FIG. 23. Meanwhile, in the case where the receiving electric power is weak, it modulates data as shown in FIG. 19C so as to drive the local oscillator light source laser 388 for performing coherent detection.

On the receiving side, the level of the output from the electric power comparator 310 is adjusted by the automatic gain controller 311, filtered by the filter 312, and demodulated by the demodulator 313. Thereafter, the demodulated signal is supplied to the switch 314.

Meanwhile, the light output from the local oscillator light source laser 308 is converged on the optical multiplexer 306 by the lens 307. The optical multiplexer 306 mixes the light input from the lens 307 and the light input from the light filter 320 so as to be supplied to the light receiving element 309a. The signal output from the light receiving element 309a undergoes the level adjustment by the automatic gain controller 315, is filtered by The light filter 316, and is demodulated by the demodulator 317. The demodulated signal is supplied to the switch 314.

In the switch 314, in response to the output from the electric power comparator 310, either the output from the demodulator 313 or that from the demodulator 317 is output in accordance with the transmission distance.

In the case of coherent detection, if the size of the light receiving portion is too large, the amplitude of the beat signal becomes unstable. Hence, the light receiving portion of the coherent detection light receiving element 309a is sized to have a diameter of 3.5 mm, while that of the direct detection light receiving element 309b is sized to have a diameter of 10 mm.

The above-mentioned configuration assures an S/N ratio of 20 dB or more when the distance between transmission and light receiving sections is 0 to 20 m.

Figure 24:
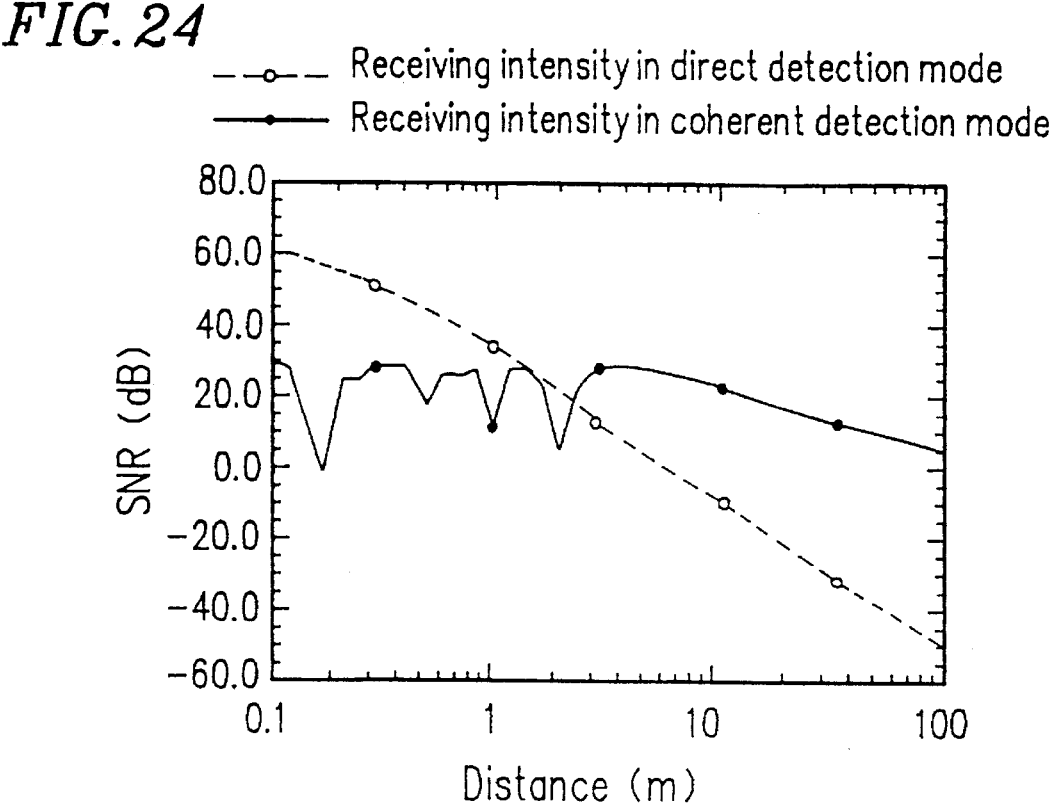
FIG. 24 is a graph showing one example of actually measured values in Example 9 of the present invention.

FIG. 24 shows one example of actually measured values of the S/N ratio. As is apparent from FIG. 24, it is most appropriate to switch between direct detection and coherent detection when the communication distance is about 2 m.

Thus, the information that the transmission method will be changed is transmitted to the transmission side at a low speed. On receiving such information, the transmission side can select the transmission method in accordance with the communication distance.

EXAMPLE 10

Figure 25:
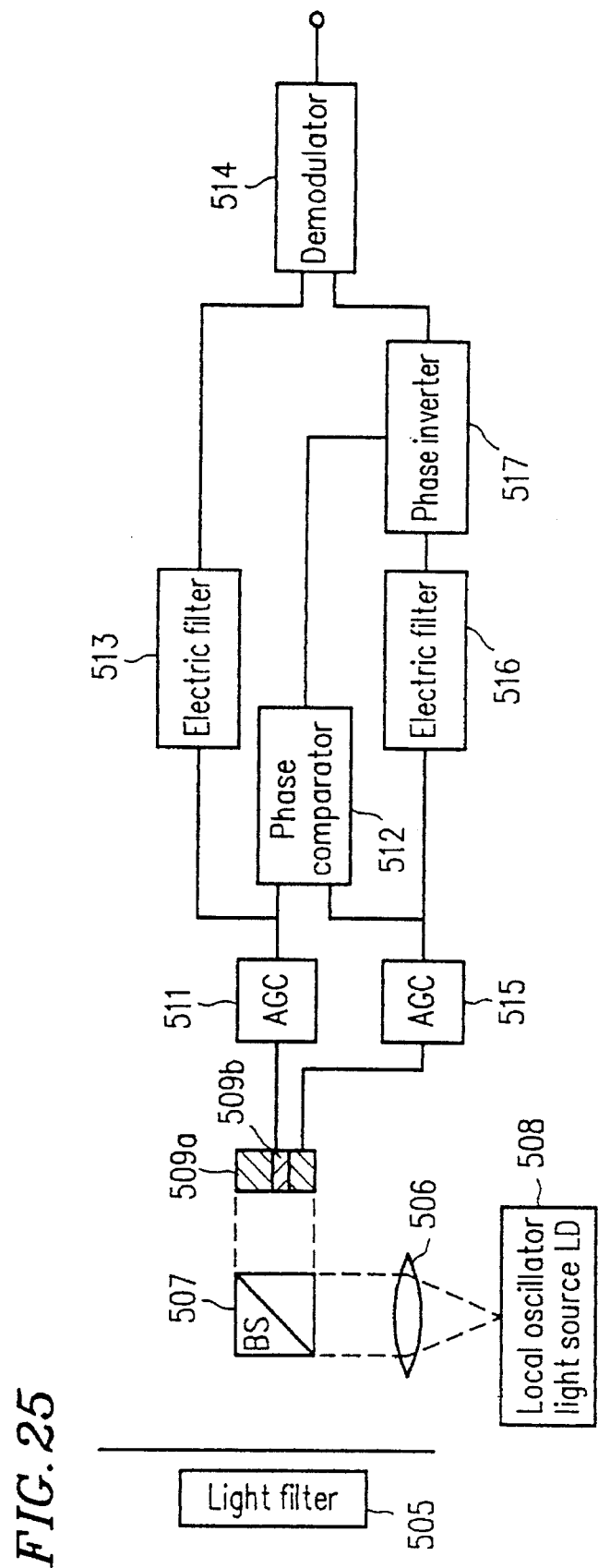
FIG. 25 is a block diagram showing the spatial light transmission apparatus of Example 10 of the present invention.

With reference to FIG. 25, a spatial light transmission apparatus of Example 10 of the present invention will be described. FIG. 25 is a block diagram showing the light receiving section of the spatial light transmission apparatus of Example 10, where the transmission side thereof is the same as that of Example 8 as shown in FIG. 17.

As shown in FIG. 25, the receiving section is composed of a light filter 505, a local oscillator light source laser (LD) 508, a lens 506, an optical multiplexer (BS) 507, a light receiving element 509a, a light receiving element 509b, an automatic gain controller (AGC) 511, an automatic gain controller (AGC) 515, a phase comparator 512, an electric filter 513, an electric filter 516, a phase inverter 517 and a demodulator 514.

The lens 506 converges the light from the local oscillator light source laser 508. The optical multiplexer 507 mixes the light transmitted through the light filter 505 and the light transmitted through the lens 506. The light receiving element 509a receives the light from the optical multiplexer 507. The light 25 receiving element 509b is incorporated into the center portion of the light receiving element 509a. The automatic gain controller 511 adjusts the level of the signal supplied from the light receiving element 509a. The automatic gain controller 515 adjusts the level of the signal supplied from the light receiving element 509b. The phase comparator 512 compares the phase of the signal supplied from the automatic gain controller 511 and that of the signal supplied from the automatic gain controller 515. The electric filter 513 filters the signal from the automatic gain controller 511. The electric filter 516 filters the signal from the automatic gain controller 515. The phase inverter 517 inverts the phase of the signal supplied from the electric filter 516. The demodulator 514 demodulates the signals supplied from the electric filter 513 and the phase inverter 517.

After passing through the light filter 505, the signal beam is incident onto the light receiving elements 509a and 509b. The light receiving element 509b has a diameter of 800 μm.

The light receiving element 509a has the light receiving element 509b incorporated at its center portion, and has an outer diameter of 4 mm. In Example 10, the two light receiving elements are coaxially disposed, but the same effects can be obtained even if they are disposed in different manners.

The beat signal caused by the beam from the local oscillator light source laser 508 and the signal beam incident from the transmission section is processed by the automatic gain controller 511 and the electric filter 513, while the beat signal from the light receiving element 509b is processed by the automatic gain controller 515 and the electric filter 516.

The beat signals from the automatic gain controllers 511 and 515 are simultaneously input to the phase comparator 512 so that the phases thereof are compared with each other.

Herein, in the case where the output from the light receiving element 509a and the output from the light receiving element 509b are in the same phase, the outputs from the two electric filters are added to each other without operating the phase inverter 517, and are demodulated into an original digital signal by the demodulator 514.

On the other hand, if the output from the light receiving element 509a and the output from the light receiving element 509b are in the reversal phases, the output from the electric filter 516 undergoes phase inversion effected by the phase inverter 517. Thereafter, the output is added to the output of the other electric filter 513 so as to be demodulated.

In Example 10, by detecting the power of the light source of the signal beam is detected, the optimum coherent detection free from fluctuations in the light intensity of the transmission light source was realized without necessity of switching the detection mode.

Figure 26:
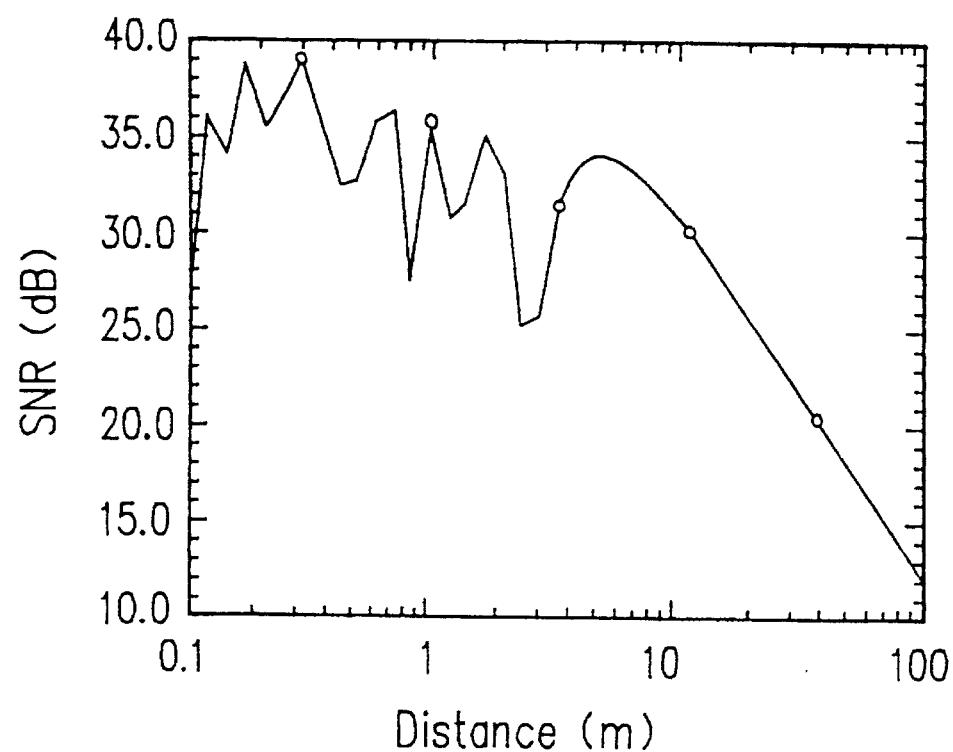
FIG. 26 is a graph showing one example of actually measured values in Example 10 of the present invention.

FIG. 26 shows the effects obtained by applying Example 10 in practice. As is apparent from this graph, the S/N ratio of 0 dB was assured when the distance between the transmission section and the receiving section is up to 30 m.

EXAMPLE 11

Figure 27:
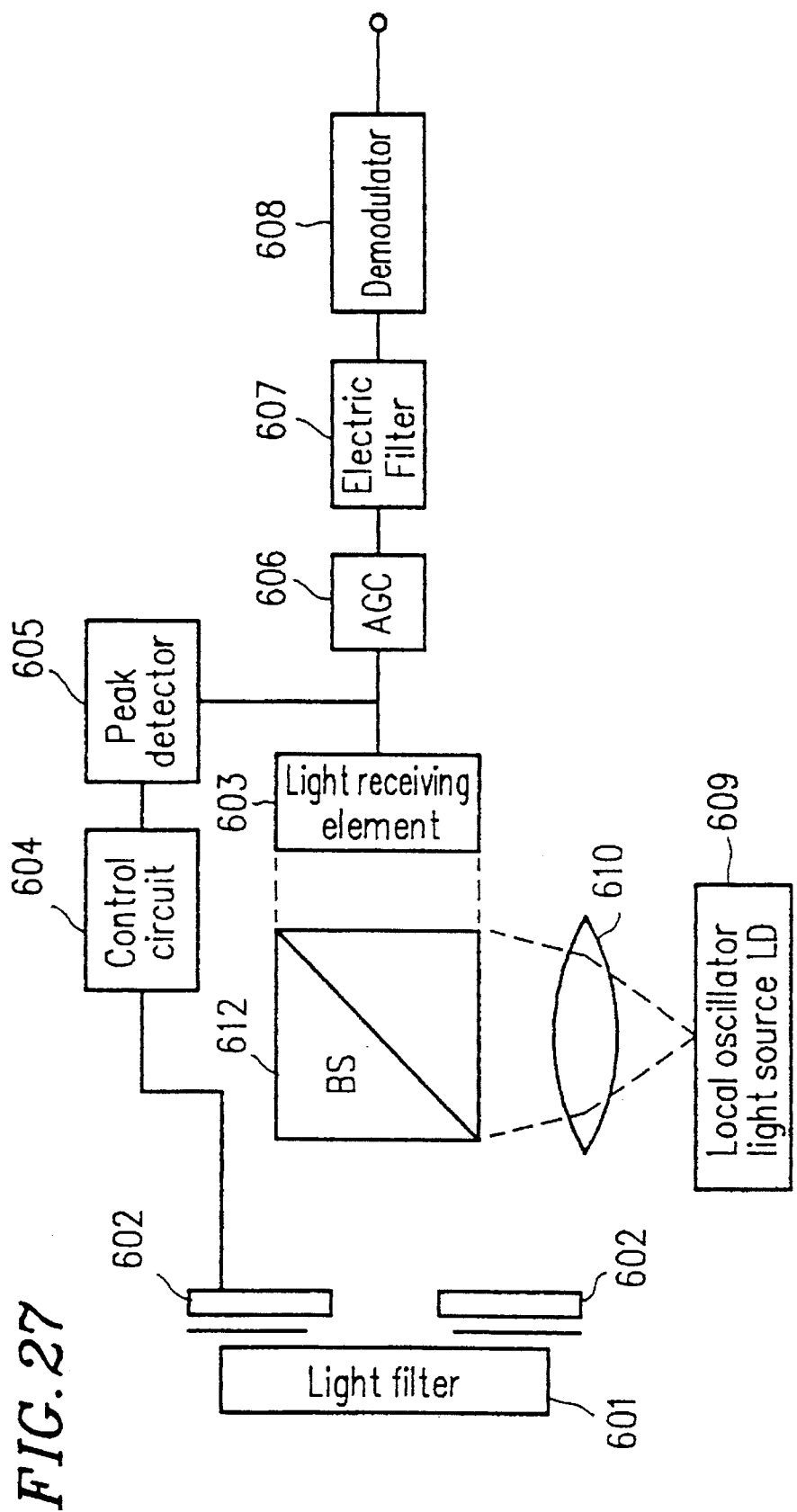
FIG. 27 is a block diagram showing the spatial light transmission apparatus of Example 11 of the present invention.

With reference to FIG. 27, a spatial light transmission apparatus of Example 11 of the present invention will be described. FIG. 27 is a block diagram showing the light receiving section of the spatial light transmission apparatus of Example 11, the transmission side thereof being the same as that of Example 8 as shown in FIG. 17.

As shown in FIG. 27, the light receiving section is composed of a light filter 601, an aperture 602, a local oscillator light source laser (LD) 609, a lens 610, an optical multiplexer 612, an automatic gain controller 606, a light receiving element 603, an electric filter 607, a demodulator 608, a peak detector 605 and a control circuit 604.

The aperture 602 adjusts the amount of light input from the light filter 601. The lens 610 converges the light from the local oscillator light source laser 609. The optical multiplexer 612 mixes the light passed through the aperture 602 and the light passed through the lens 610. The light receiving element 603 converts the beat signal supplied from the optical multiplexer 612 into an electric signal. The automatic gain controller 606 adjusts the level of the signal supplied from the light receiving element 603. The electric filter 607 filters the signal from the automatic gain controller 606. The demodulator 608 demodulates the signal supplied from the electric filter 607. The peak detector 605 detects the maximum value of the intensity of the beat signal supplied from the light receiving element 603. The control circuit 604 controls the aperture 602 in response to the signal from the peak detector 605.

The operation of the receiving section according to the above-mentioned configuration will be described.

After passing through the light filter 601, the incident signal beam passes through the aperture 602 and is incident onto the light receiving element 603, which has a diameter of 1 cm.

The beat signal caused by the beam from the local oscillator laser 609 and the incident signal beam is detected by the light receiving element 603 and is processed by the automatic gain controller 606 and the electric filter 607, so as to be demodulated into an original digital signal by the demodulator 608. Herein, the aperture 602 is variable by the control circuit 604, and the maximum value of the intensity of the beat signal is detected by the peak value detector 605. Thus, the aperture 602 is controlled so as to maximize the beat signal intensity.

Varying the aperture 602 equivalently changes the size of the light receiving element, thus always allowing the stable beat signal detection.

In addition, in the case where the frequency of the locally oscillated beam is set at $v3$ and the difference $|v1-v2|$ between the oscillation frequencies of the signal beam is reduced, it will be appreciated that a modulation/demodulation method such that the beat signal has a frequency of binary values, i.e. $|v3-v1|$ and $|v3-v2|$, which can be demodulated into 0 and 1, respectively, can be employed.

In this way, by employing only the coherent detection method and using a light receiving element having a light receiving portion of which size is substantially variable, the data transmission is stably performed regardless of the communication distance.

EXAMPLE 12

Figure 28:
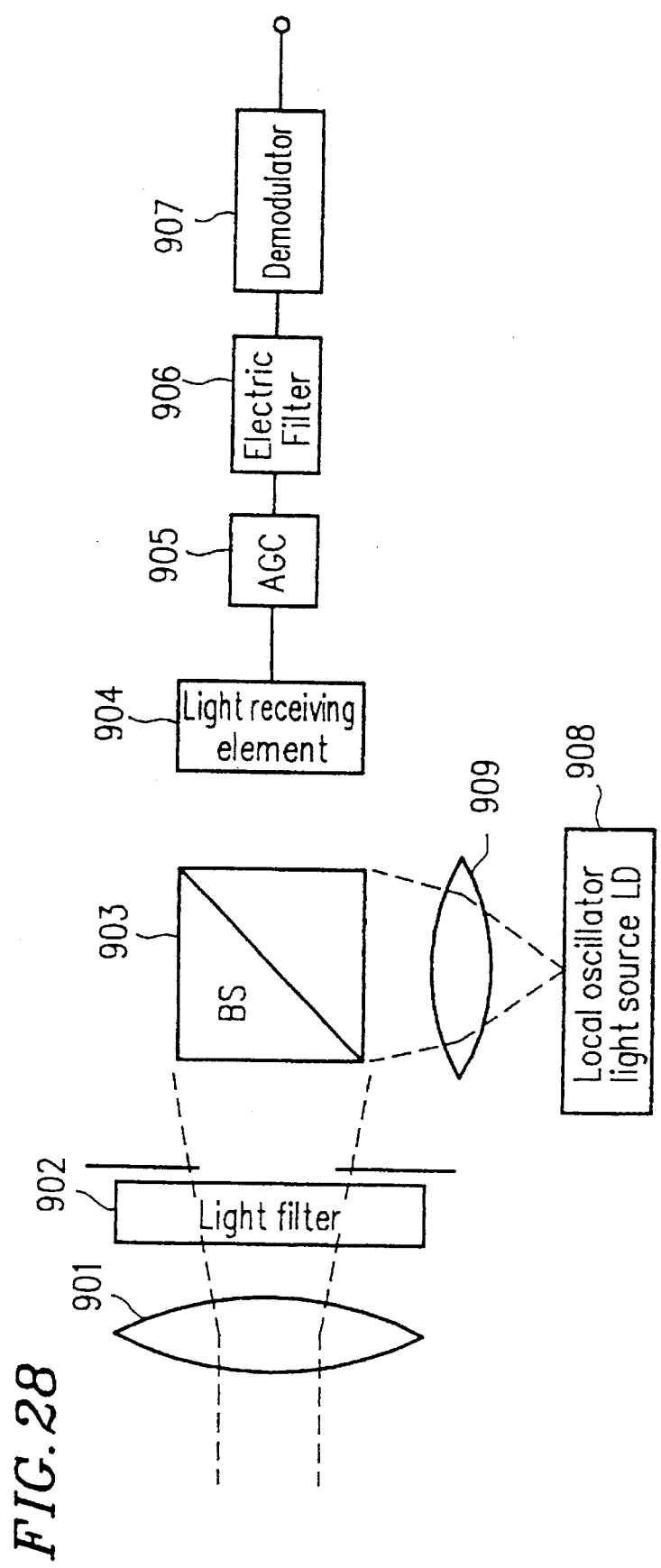
FIG. 28 is a block diagram showing the spatial light transmission apparatus of Example 12 of the present invention.

With reference to FIG. 28, a spatial light transmission apparatus of Example 12 of the present invention will be described. FIG. 28 is a block diagram showing the light receiving section of the spatial light transmission apparatus of Example 12, the transmission side thereof being the same as that of Example 8 as shown in FIG. 17.

As shown in FIG. 28, the light receiving section is composed of a collective lens 901, a light filter 902, a local oscillator light source LD 908, a lens 909, an optical multiplexer 903, a light receiving element 904, an automatic gain controller 905, an electric filter 906 and a demodulator 907.

The lens 909 collects the light from the local oscillator light source laser 908. The optical multiplexer 903 mixes the light transmitted through the light filter 902 and that from the light passed through the lens 909. The light receiving element 904 converts the beat signal supplied from the optical multiplexer 903 into an electric signal. The automatic gain controller 905 adjusts the level of the signal supplied from the light receiving element 904. The electric filter 906 filters the signal from the automatic gain controller 905. The demodulator 907 demodulates the signal supplied from the electric filter 906. In Example 12, a collective lens 901 is disposed in front of the light filter 902. The focal length of this collective lens 901 is 10 m. In the case where the distance between the transmission light source and the receiving device is 10 m or more, by means of this lens, the received signal beam becomes apparent spherical waves from the point corresponding to the distance of about 10 m.

Furthermore, by adjusting the position of the lens 901, the curvature of the wavefront of the locally oscillated beam may be caused to coincide with that of the signal beam, which results in a more efficient coherent detection.

A fixed focus lens is used for the lens 901 in Example 12, but it can be replaced with a variable focus lens. In such a case, more desirable effects are obtainable by controlling the variable focus lens in accordance with the intensity of the received signal or the detected beat signal.

Thus, the intensity of the beat signal can be sufficiently obtained An long distance transmission, by providing a collective lens with the receiving side. As a result, an optimum receiving operation is assured for a predetermined range of the distance.

Also in Example 12, the alignment of the traveling direction of the signal beam and that of the locally oscillated beam allows the beat signal to be more efficiently detected.

In Example 12, a semiconductor laser diode (LD) with a high coherency is used as a transmission light source, and direct detection using the modulation of light intensity is applied to short distance communication, while coherent detection with the use of a locally oscillated beam is applied to long distance communication. Thus, a stable data transmission is assured both for short and long distance communications.

In addition, the function of changing the size of the light receiving portion for the coherent detection in accordance with the transmission distance is provided, which assures a stable beat signal detection is assured for the data transmission of a communication distance of from several centimeters to several tens of meters.

The configurations of Examples 1 through 12 make the effects as listed below as (1) through (5) obtainable:

(1) The transmission side monitors the receiving side, whereby the data transmission can be performed after the receiving side confirms the coherent detection state at the time of starting the communication operation. Thus, the loss of data during data transmission can be found, which allows the data to be resent.

Also, it has been impossible to know whether the transmission side is transmitting data or not because the coherent detection is impossible when the wavelength tuning is not attained on the receiving side. However, it is easily known by the receiving side because the receiving side monitors the transmission side, and because the transmission side simultaneously transmits the intensity modulated control signal. Then, it becomes possible to perform the wavelength tuning by scanning the temperature of the locally oscillated beam, detecting the frequency of a generated beat signal by the frequency discrimination circuit and controlling the frequency so as to be constant.

(2) The wavelength tuning on the receiving side can be rapidly performed, especially, by informing the receiving side of the temperature and oscillation frequency of the light of the transmission side. That is, the transmission side transmits wavelength information to the receiving side, whereby a more rapid wavelength tuning is realized on the receiving side. This is particularly effective for communication between places with a large difference in temperature therebetween. Moreover, the transmission side detects the wavelength with high accuracy (i.e. ±0.1 nm), which allows the receiving side to judge for an instant whether the wavelength or the wavefront is deviated.

(3) In the case where the intensity and frequency of the beat signal are detected by the receiving side as the receiving conditions, they are usable as the clue for determining the process of the wavefront alignment and wavelength tuning. That is, the receiving side successively detects the frequency and amplitude of the beat signal, whereby it can be judged whether the wavefront or wavelength has been deviated. This makes it possible to obtain more rapidly and simply the state suitable for coherent detection. Also, because the transmission side and the receiving side mutually monitor the state of each other, the apparatus can judge whether the data is to be resent, whether the laser is out of order, and the like, thereby controlling each of the functions in the most appropriate manner. Especially, even in a binary directional coherent light transmission apparatus, it is conventionally impossible for the transmission and receiving sides to mutually monitor each other's condition in the case where neither the wavefront alignment nor wavelength tuning is attained. However, this is realized for the first time by using the light intensity modulation and the direct detection technique in combination. By monitoring the light receiving current, the intensity of the background light can be known, which makes it possible to require the transmission side to cancel, resend or continue the data transmission.

(4) There is no interference between the light coherent detection and the direct detection by the light intensity modulation. Accordingly, a part of the light receiving elements may be used also as a part of the light receiving elements, that is, the same device is used for generating the coherent signal beam or the locally oscillated beam as well as for generating the intensity modulated beam as the control signal. Otherwise, the light receiving element for the coherent detection may be used also as the light receiving element for the direct detection of the control signal, together with a filter for separating the beat signal and the intensity modulated signal. Thus, a compact apparatus with a simple configuration is realized.

(5) In the conventional wireless optical communication, long distance data transmission is not realized by the direct detection method, while short distance data transmission is not stably performed by the coherent detection method. However, according to the present invention, by employing the detection method in accordance with a communication distance, a stable data transmission is ensured both for short and long distance communications.

Also, with respect to the coherent detection method, by using a light receiving element having a light receiving portion whose size is variable, the spatial light transmission apparatus assuming a stable data transmission irrespective of the communication distance is realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A spatial coherent light transmitting apparatus comprising:

a first device for emitting a data signal as first coherent light;

a second device for receiving the first coherent light and for producing second coherent light having a wavelength little different from that of the first coherent light, said second device mixing the first and second coherent lights, and performing a coherent detection of the data signal, each of the first device and the second device having a detection means for detecting at least one of a coherent light transmission state and a coherent light detection state; and a control means for controlling at least one of the first device and the second device in response to information of the state detected by the detection means.

2. A spatial coherent light transmission apparatus according to claim 1, wherein the control means includes:

a control signal transmission section for transmitting a control signal intensity-modulated in accordance with the information of the state detected by the detection means;

a control signal light receiving section for receiving the control signal; and a control section for controlling transmission of the data signal by performing a direct detection of a photocurrent received by the control signal light receiving section.

3. A spatial coherent light transmission apparatus according to claim 1, wherein at least one of a beat signal intensity, a beat signal frequency and a noise current intensity is detected by the detection means as the coherent light detection state.

4. A spatial coherent light transmission apparatus according to claim 1, wherein a temperature and an oscillation frequency is detected by the detection means as the coherent light transmission state.

5. A spatial coherent light transmission apparatus according to claim 2, comprising:

a receiving section providing a means for receiving the first and second coherent lights, the means serving also as a control signal light receiving section for receiving the control signal;

a filter section for separating a signal received by the receiving section into the control signal and a beat signal;

a control signal detection section for performing a direct detection of the control signal separated by the filter section; and a beat signal detection section for performing the coherent detection of the beat signal separated by the filter section.

6. A spatial coherent light transmission apparatus according to claim 1, wherein the second device includes:

a light receiving means for receiving and converting the mixed first and second coherent lights into an electric signal;

a control signal outputting means for outputting a control signal in accordance with a value of the electric signal in accordance with a value of the electric signal converted by the light receiving means;

a direct detection means for performing a direct detection by using the electric signal; and a switching means for switching the direct detection performed by the direct detection means and the coherent detection, in response to the control signal.

7. A spatial coherent light transmission apparatus according to claim 6, wherein the second device includes:

a locally oscillated beam generating means for generating a locally oscillated beam for the coherent detection; and an oscillation frequency switching means for switching an oscillation frequency of the locally oscillated beam generating means in response to the control signal.

8. A spatial coherent light transmission apparatus according to claim 6, wherein the second device includes a transmitting means for transmitting a control data signal to the first device in response to the control signal; and the first device includes a signal receiving means for receiving the control data signal transmitted from the transmitting means and a modifying means for modifying a modulation method in response to the control data signal received by the signal receiving means.

9. A spatial coherent light transmission apparatus according to claim 6, wherein the second device includes:

a light amount adjustment means for adjusting a light amount input to the light receiving means;

a maximum value detection means for detecting a maximum value of the beat signal supplied from the light receiving means; and a light amount control means for controlling the light amount adjustment means in response to an output signal from the maximum value detection means.

10. A spatial coherent light transmission apparatus according to claim 6, wherein the second device includes:

another light receiving means disposed adjacent to the light receiving means;

a phase difference detection means for detecting a phase difference between a signal from the light receiving means and a signal from the another light receiving means;

a phase inversion means, connected to one of the light receiving means and the another light receiving means, for inverting a phase of the signal from the connected light receiver means in response to an output signal of the phase difference detection means; and an addition means for adding the signal having its phase inverted by the phase inversion means and the signal of the other of the light receiving means and the another light receiving means.

11. A spatial coherent light transmission apparatus according to claim 6, further comprising a collecting means for collecting incident light, disposed on a front face of the second device.

12. A spatial coherent light transmission apparatus according to claim 6, further comprising an aperture means for limiting incident light, disposed on a front face of the second device.

13. A spatial coherent light transmission apparatus comprising:

a first device for emitting a data signal as first coherent light; and a second device for receiving the first coherent light and for producing second coherent light having a wavelength little different from that of the first coherent light, said second device mixing the first and second coherent light, and performing a coherent detection of the data signal, the second device including a detection means for detecting a coherent light detection state; and a control means for controlling at least one of the first device and the second device in response to information of the state detected by the detection means.

14. A spatial coherent light transmission apparatus according to claim 13, wherein the control means includes:

a control signal transmission section, disposed in the second device, for transmitting a control signal intensity-modulated in accordance with the information of the state detected by the detection means;

a control signal light receiving section, disposed in the first device, for receiving the control signal; and a control section disposed in the first device, for controlling transmission of the data signal by performing a direct detection of a photocurrent received by the control signal light receiving section.

15. A spatial coherent light transmission apparatus according to claim 14, wherein the control means further includes a wavelength tuning section, disposed in the second device, for controlling a wavelength of the second coherent light so as to attain a wavelength tuning based on information of the state detected by the detection means.

16. A spatial coherent light transmission apparatus according to claim 13, wherein at least one of a beat signal intensity, a beat signal frequency and a noise current intensity is detected by the detection means as the coherent light detection state.

17. A spatial coherent light transmission apparatus according to claim 14, wherein one unit serves as the first device for emitting a light signal as the first coherent light, as a means for generating the second coherent light, and as the control signal transmission section for transmitting the control signal, and another unit serves as a means for receiving the first and second coherent lights and as a control signal light receiving section for receiving the control signal, whereby the first device serves also as the second device.

18. A spatial coherent light transmission apparatus according to claim 14, comprising:

a receiver section serving both as a means for receiving the first and second coherent lights and as a control signal light receiving section for receiving the control signal;

a filter section for separating a signal received by the receiver section into the control signal and a beat signal;

a control signal detection section for performing a direct detection of the control signal separated by the filter section; and a beat signal detection section for performing the coherent detection of the beat signal separated by the filter section.

19. A spatial coherent light transmission apparatus according to claim 13, wherein the second device includes:

a light receiving means for receiving and converting the mixed first and second coherent lights into an electric signal;

a control signal outputting means for outputting a control signal in accordance with a value of the electric signal converted by the light receiving means;

a direct detection means for performing a direct detection by using the electric signal; and a switching means for switching the direct detection performed by the direct detection means and the coherent detection, in response to the control signal.

20. A spatial coherent light transmission apparatus according to claim 13, wherein the second device includes:

a locally oscillated beam generating means for generating a locally oscillated beam for the coherent detection; and an oscillation frequency switching means for switching an oscillation frequency of the locally oscillated beam generating means in response to the control signal.

21. A spatial coherent light transmission apparatus according to claim 13, wherein the second device includes a transmitting means for transmitting a control data signal to the first device in response to the control signal, and the first device includes a receiving means for receiving the control data signal transmitted from the transmitting means and a modifying means for modifying a modulation method in response to the control data signal received by the receiving means.

22. A spatial coherent light transmission apparatus according to claim 13, wherein the second device includes:

a light amount adjustment means for adjusting a light amount input to the light receiving means;

a maximum value detection means for detecting a maximum value of the beat signal supplied from the light receiving means; and a light amount control means for controlling the light amount adjustment means in response to an output signal from the maximum value detection means.

23. A spatial coherent light transmission apparatus according to claim 19, wherein the second device includes:

another light receiving means disposed adjacent to the light receiving means;

a phase difference detection means for detecting a phase difference between a signal from the light receiving means and a signal from the another light receiving means;

a phase inversion means, connected to one of the light receiving means and the another light receiving means, for inverting a phase of the signal from the connected light receiving means in response to an output signal of the phase difference detection means; and an addition means for adding the signal having its phase inverted by the phase inversion means and the signal of the other of the light receiving means and the another light receiving means.

24. A spatial coherent light transmission apparatus according to claim 19, further comprising a collecting means for collecting incident light, disposed on a front face of the second device.

25. A spatial coherent light transmission apparatus according to claim 19, further comprising an aperture means for limiting incident light, disposed on a front face of the second device.

26. A spatial coherent light transmission apparatus comprising:

a first device for emitting a data signal as first coherent light, the first device including a detection means for detecting a coherent light transmission state;

a second device for receiving the first coherent light and for producing second coherent light having a wavelength little different from that of the first coherent light, said second device mixing the first and second coherent light, and performing a coherent detection of the data signal; and a control means for controlling at least one of the first device and the second device in response to information of the state detected by the detection means.

27. A spatial coherent light transmission apparatus according to claim 26, wherein:

the first device includes a first detection section for detecting a coherent light transmission state, and a signal transmission section for transmitting a control signal of information of the state detected by the first detection section as a light signal obtained by intensity-modulating the data signal;

the second device includes a signal receiving section for receiving the light signal, a second detection section for detecting a coherent light transmission state and a coherent light detection state from the control signal and the data signal of the light signal received by the signal receiving section, and a wavelength tuning section for controlling a wavelength of the second coherent light based on information of the state detected by the second detection section so as to attain a wavelength tuning;

the detection means includes the first and second detection sections; and the control means includes the signal transmission section and the wavelength tuning section.

28. A spatial coherent light transmission apparatus according to claim 27, wherein at least one of a beat signal intensity, a beat signal frequency and a noise current intensity is detected by the detection means as the coherent light detection state.

29. A spatial coherent light transmission apparatus according to claim 27, wherein a temperature and an oscillation frequency is detected by the detection means as the coherent light transmission state.

30. A spatial coherent light transmission apparatus according to claim 27, wherein one unit serves as the first device for emitting a light signal as the first coherent light, as a means for generating the second coherent light, and as the control signal transmission section for transmitting the control signal, and another unit serves as a means for receiving the first and second coherent lights and as a control signal light receiving section for receiving the control signal, whereby the first device serves also as the second device.

31. A spatial coherent light transmission apparatus according to claim 27, comprising:

a receiving section including a means for receiving the first and second coherent lights, the means serving also as a control signal light receiving section for receiving the control signal;

a filter section for separating the signal received by the receiving section into the control signal and a beat signal;

a control signal detection section for performing a direct detection of the control signal separated by the filter section; and a beat signal detection section for performing the coherent detection of the beat signal separated by the filter section.

32. A spatial coherent light transmission apparatus according to claim 27, wherein the second device further includes a control signal transmission section for transmitting a second control signal intensity-modulated in accordance with information of the state detected by the detection means; and the first device includes a control signal light receiving section for receiving the second control signal, and a control section for controlling transmission of the data signal by performing a direct detection of a photocurrent received by the control signal light receiving section.

* * * * *